US008369622B1

(12) United States Patent
Hsu et al.

(10) Patent No.: US 8,369,622 B1
(45) Date of Patent: Feb. 5, 2013

(54) MULTI-FIGURE SYSTEM FOR OBJECT FEATURE EXTRACTION TRACKING AND RECOGNITION

(76) Inventors: Shin-yi Hsu, Vestal, NY (US); Jane H. Hsu, Vestal, NY (US); Sigmund H. Hsu, Vestal, NY (US)

( * ) Notice: Subject to any disclaimer, the term of this patent is extended or adjusted under 35 U.S.C. 154(b) by 308 days.

(21) Appl. No.: 12/608,202

(22) Filed: Oct. 29, 2009

(51) Int. Cl.
*G06K 9/46* (2006.01)

(52) U.S. Cl. ...................................... 382/190; 382/181
(58) Field of Classification Search .................. 382/181, 382/190, 133, 103, 128, 134; 340/636.17; 324/536; 356/301, 446; 700/180, 182; 702/59, 702/62; 600/586
See application file for complete search history.

(56) References Cited

U.S. PATENT DOCUMENTS

| 5,341,142 A * | 8/1994 | Reis et al. ...................... 342/64 |
| 6,741,744 B1 | 5/2004 | Hsu |
| 7,343,051 B1 | 3/2008 | Hsu |

* cited by examiner

*Primary Examiner* — Anh Hong Do
(74) *Attorney, Agent, or Firm* — Mark Levy; Hinman, Howard & Kattell, LLP

(57) ABSTRACT

The invention features a system wherein a recognition environment utilizes comparative advantages of automated feature signature analysis and human perception to form a synergistic data and information processing system for scene structure modeling and testing, object extraction, object linking, and event/activity detection using multi-source sensor data and imagery in both static and time-varying formats. The scene structure and modeling and testing utilizes quantifiable and implementable human language key words. The invention implements real-time terrain categorization and situational awareness plus a dynamic ground control point selection and evaluation system in a Virtual Transverse Mercator (VTM) geogridded Equi-Distance system (ES) environment. The system can be applied to video imagery to define and detect objects/features, events and activity. By adapting the video imagery analysis technology to multi-source data, the invention performs multi-source data fusion without registering them using geospatial ground control points.

13 Claims, 34 Drawing Sheets

| 1 | A complex object |
|---|---|
| 2 | Distance between the centroids of each ROI is less than the sum of the distances from the ROIs centroid to its respective edge. |
| 3 | Moving on collision course towards each – predicted path and velocity intersect. |

Figure 4

| Attributes of Candidate Car ROI are given |
|---|
| Attributes of Candidate Car Door are given |
| Candidate CAR ROIs are masked |
| Candidate CAR DOOR ROIs are masked |
| Database for Candidate CAR and CAR DOOR ROIs are built |

| feat file | Time_1 | time_2 | time_3 | time_4 | time_5 | time_6 | time_7 | time_8 |
|---|---|---|---|---|---|---|---|---|
| obj[1]_tracker Car_Body | 2 | 2 | 3 | 3 | 3 | 3 | 3 | 3 |
| Inclination | 130 | 130 | 178 | 141 | 139 | 151 | 139 | 18 |
| obj[2]_tracker Car_Door | 3 | 4 | 2 | 2 | 2 | 2 | | |
| Inclination | | 171 | 34 | 54 | 40 | 72 | 147 | |
| Delta | | 41 | 144 | 87 | 99 | 79 | 8 | |
| Event Rule | | | | | | | | |
| >70 <160 | NA | NO | OK | OK | OK | OK | NO | NA |

| Gcp id | Tampa (dx) | Tampa (dy) | Tampa Mean | Camp lejeune (dx) | Camp lejeune (dy) | Camp lejeune Mean |
|---|---|---|---|---|---|---|
| #1 | -0.35517 | 4.7588 | | 0.0081 | 0.1341 | |
| #2 | -2.0718 | -1.6637 | | 0.0061 | -0.0824 | |
| #3 | -2.9535 | -4.0243 | | -0.0837 | -0.1029 | |
| #4 | -1.9773 | -2.6124 | | -0.2381 | -0.5508 | |
| #5 | 10.5543 | -4.5070 | | 0.3076 | 0.6021 | |
| Overall | | | 5.67(pixels) | | | 0.33(pixels) |

MULTI-FIGURE SYSTEM FOR OBJECT FEATURE EXTRACTION TRACKING AND RECOGNITION

FIELD OF THE INVENTION

The invention relates to object feature extraction and recognition and, more particularly, to a system that improves the capability of the sensor and improves the data analysis algorithms.

BACKGROUND OF THE INVENTION

The fundamental goal of image analysis is to convert image/sensor data into useful information. To facilitate this data-to-information conversion process, researchers have developed sensors that exploit the properties of various sections of the electromagnetic energy spectrum as a means to detect and measure objects in images. "Electromagnetic energy refers to all energy that moves with the velocity of light in a harmonic wave pattern" (Sabin, 1987). Electromagnetic energy (EE) sensors are classified into two broad categories: (1) passive sensors, which use reflected background and emitted energy from objects to generate images, and (2) active sensors, which themselves generate and project energy and then detect the returned signal to image objects. For example, electro-optical (EO) sensors, such as a digital aerial camera and Landsat's multispectral scanner (MSS), are passive sensors; whereas, real aperture radar (RAR), synthetic aperture radar (SAR), and Light Detection and Ranging (LIDAR) are active sensors. An example of fusing passive and active sensor data has been demonstrated by one of the present inventors.

To effectively convert image/sensor data to useful information for object extraction and recognition, researchers have attempted to improve the system from two major directions: (a) improve the capability of the sensor through (i) improving the resolution or ground sampling distance (GSD) of the sensor data/imagery, and (ii) improving sensor dynamic range by increasing the number of detected spectral bands, aspect angles and polarizations; and (b) improve the data analysis algorithms used to process the image/sensor data. Comparing sensing systems, the resolution of Landsat's Thematic Mapper (TM) is approximately 30 meters, whereas, the resolution of Space Imaging's IKONOS is 4 meters for its MSI, and 1 meter for its panchromatic imagery. However, since Landsat TM has seven spectral bands, and IKONOS has only four bands, the LANDSAT TM sensor is superior based on number of spectral bands. Alternatively, since the resolution of the IKONOS system is 4 meters, compared to 30 meters for Landsat TM, the IKONOS sensor is superior based on image resolution. Although the SAR images typically only have one band, this can be increased by using multiple polarization modes of this active sensor. Recent improvement in LIDAR technology permits researcher to exploit using object height information for object discrimination.

While texture analysis algorithms have been used since 1970s, few have studied human subject texture perception compared to machine analyses. In 1978 the Air Force Office of Scientific Research (AFOSR) awarded a contract to Susquehanna Resources and Environment, Inc. to investigate the relationship between micro-texture and global structure in human visual perception of object recognition. Related experiments were published in 1980. In 2006, P. J. Petite and E. L. van den Broek conducted human versus machine analysis using 450 human objects. Both studies found a high degree of individual difference in performing image object recognition. For example, the SRE/AFOSR study found individual difference ranged to the high end of 25 percent. The Petite and Broek study determined the contribution of texture in human perception agreement ranged from 78% in a color-shapeless condition, to 60% in a gray, six shape condition.

While it is possible to increase the number of sensor bands or improve optics to improve the object recognition capability of passive sensors, these sensors (visible and near infra red) are largely limited to daytime and good weather conditions. SAR on the other hand is capable of night-time and near-all-weather sensing; however, it is usually limited to one single band. To improve its capability, researchers have developed a spot light mode SAR capable of imaging the same object and its surrounding field from various aspect angles. For example, if the aspect angle interval is 2 degrees, there will be 180 images for one particular sensing field. The drawback of this increased sampling for object classification is the problem of requiring an unmanageable number of matching libraries to model all possible varying SAR-object interaction conditions.

In contrast to the "unmanageable number of matching libraries," the human visual system is capable of performing object recognition using much fewer dimensions, particularly when the task is "defined." For example, in a Hsu and Burright study, the dominant perceptual dimensions were three—Brightness, Texture and Structure—which accounted for 75% to 80% of the human visual system based decision making process.

When sensor data is processed to optimally define the object recognition task for the human visual system, it can mitigate individual perceptual differences. This creates a synergy between a sensor and a perceptual system in object/feature recognition. The current invention is centered precisely on this topic with the innovative system implementation.

For visual processing, an example of a discrete task is "finding a small-size, circular and bright object." The object descriptors (small, circular, bright) have been called "photo-interpretation keys." These keys are largely spatial, whereas the primary capability from image sensors is largely spectral. The proposed invention integrates the image sensor spectral capability with human perception spatial analysis capability, in a system that exploits fundamental human visual "figure-ground" recognition capability in a multi-tone image space as the figure-ground mapping propagates over the entire image surface. The invention creates an image surface composed of spectral and spatial figure-ground structures for object/feature recognition.

The current invention is a real-time system of software/hardware, which integrates sensor data with information analysis and fuses the imagery/sensor data/geospatial registration to improve the perception of a human analyst by focusing the analyst's attention on a fundamental figure/ground structure. Since the desired object of interest (OOI) could range from a single object to a complex group of both features and objects, the real-time data analysis and information visualization system needs to be flexible enough to cover both single-feature and multi-feature extraction tasks. Since the task may require many dominant signatures to generate the multi-tone figure-ground structures for object/feature extraction, the human analyst needs to have the best visualization means to make the final decision. To this end, a set of dominant feature/object signatures are generated, and a system implementation for it has been completed.

There is no generally agreed upon mathematical solution to the problem of determining when to stop a scene segmentation process. In the current invention, it is proposed that an extracted object signature be allowed to feed back and combine with the original image data set to define a new signature search space. By the same principle, an independent source is also allowed to influence or enhance the feature space and reduce the object-search space.

The current invention provides a means to visualize how well an observed pixel is matched against a feature signature in a feature signature library with a quantitative measure. Using multiple feature signatures, the analyst has the means to visualize how well a given pixel, and/or a group of pixels match against a set of single and/or group-based feature signatures simultaneously. This real-time processing creates an optimal visualization environment where a figure ground structure is simply a two-tone image made by a simple and yet perceptually meaningful ranking analysis, such as the upper quartile for "figure" and the rest as "ground" from a feature scene.

Using multiple dominant feature signatures, there is the possibility of overlap between two figure ground mappings. To create non-overlapping figure ground mappings, the current invention provides a means to determine or eliminate the overlapped feature pixels and then create a non-overlapping figure ground structure, if necessary.

For the current invention, a feature signature is represented by a set of generic input bands (artificial or real-sensor-generated). If the analyst determines that the signature is not adequate, the number of bands can be increased through appropriate mathematical means. The number of bands may also be decreased, for example to reduce computation time. Therefore, both the feature signature, and the figure-ground structure is tunable, loadable and can be updated in real time.

Remote sensing geospatial accuracy has been limited by data generated with inaccurate and inconsistent ground control points (GCP). Using image rectification methods of pixel resampling or interpolation to register images usually alters the pixels' original digital number (DN) value. By definition, this contaminates/alters the sensor spectral data, rendering it practically unusable for object/feature extraction. As a result, remote sensing researchers have not been able to fully take advantage of multi-sensor imagery and multi-source data to perform object extraction because the data sources are not well geospatially registered. The current invention overcomes this fundamental data fusion problem by allowing users to perform data fusion without requiring a priori registration of the input data. This object oriented methodology is adaptable to multi-source data fusion, since successive video frames are generally not geospatially registered.

As noted earlier, the GCP from dissimilar sensors or same sensor from different acquisitions rarely match, rendering two mismatched coordinate or geo-coordinate systems. In addition, since warping can achieve a fit between two images, the match between a camera model and the reality is rarely tested. The current invention mitigates such coordinate-mismatch and inadequate modeling condition by providing the users with means to deploy a real-time dynamic GCP/image matching and evaluation system to unify two coordinate systems into one field-mapping system with a geogrid centered on a user-selected projection center, such as one of the GCP, yielding a Virtual Equi-Distance system (VEDS) built on the Virtual Transverse Mercator Projection (VTM) described in U.S. Pat. No. 7,343,051 awarded to the lead inventor of the current application.

For the past 20 years, scene content analyses have been approached from the paradigm of scene indexing, content-based object extraction, archiving and retrieval. Few have been oriented toward scene content modeling and testing for system implementation. To fill this gap, this invention uses a set of quantifiable and implementable human language key words in a simultaneous equation like configuration to model and test scene content until an optimal model is determined for a specific object extraction/linking application.

Similarly, for the past 40 years, Automatic Target Recognition (ATR) has been approached from a paradigm of still imagery with few real world applications to show for it.

Therefore, it is more advantageous to develop a feature cueing and recognition system that uses sensing and data processing means to generate multi-faceted figure ground structures for object recognition.

It is also advantageous to generate both "figure" and "ground" as a means for perceptually-based object cueing and recognition. Since the vast majority of past research has been centered on how to create "feature," rather than "ground," the current invention represents a significant departure from conventional approaches.

It is advantageous that "figure" versus "ground" decision be tunable by the analyst.

It is also advantageous that a figure ground structure be definable by a feature signature and multiple feature signatures to generate a multi-tone figure ground structure mosaic system over an image.

It is advantageous to be able to either increase or decrease the dimensions of the feature space.

It is equally advantageous to know which area contains known objects, and which area does not contain objects of interest.

It is advantageous to visualize quantitatively the spectral and spatial relationships between a known object/feature and an observed pixel in real time.

It is also advantageous to use one object signature extracted from an image to generate object based images for object recognition from other images of dissimilar resolution and dissimilar sensor type.

It is also advantageous to use an independent object signature to influence the object search space for object recognition.

Similarly, it is advantageous to classify a pixel as "other" to absorb pixels that are dissimilar to a set of labeled feature signatures.

It is also advantageous to use all "others" to create generic labeled feature signatures to generate an overall figure/ground structure that includes "unknowns" for object cueing and recognition.

It is advantageous to permit generation of a feature signature for each of the "unknowns" as a new set into the feature signature space.

It is also important and advantageous to post-process feature-signature scenes using spectral and spatial analysis means for object cueing and recognition.

Similarly, it is also important and advantageous to visualize how well a pixel is matched to each of the input feature signatures.

Similarly, it is also important and advantageous to allow the analyst to modify a feature signature in real time.

Similarly, it is important and advantageous to visualize how well a group of pixels is matched to a group of feature signatures.

It is also important and advantageous to generate a color composite to visualize the multi-tone figure ground structures for object cueing and recognition.

It is critical and advantageous that the above figure ground visualization system be either an automated system, a user-based interactive system, or a firmware based system.

Similarly, it is advantageous to accept video images as input rather than limit a system to process only still images.

Using video images as input, it is advantageous to accept subset-partitioned images as input. Accepting a moving object versus non-moving object partitioned image as input is a case in point.

Similarly, it is important and advantageous to generalize from a two-feature partitioned image to a generic multi-subset partitioned image as input to the inventive system.

With a generic subset-partitioned image as input, it is advantageous to generate the scene content for each subset region with the above-discussed dominant features plus their "ground" sets as either "other features" or "unknowns."

It is critical and advantageous to allow users to perform multi-source data fusion without a priori registration. Geospatially registered inputs would also be accepted to serve as a base to register any unregistered inputs as well.

Similarly, it is advantageous to disseminate the results of data analysis, pixel-matching, enhanced pixels for object perception, visualized sub-scene and full-scene and associated databases to users who may provide independent sources as feedback to the current invention system.

Similar to a visualization environment, it is advantageous to provide a computational environment to use multiple pixels from an individual object as a spectral signature complex to perform pixel discrimination.

It is also advantageous to visualize a spectral complex for pixel discrimination and object recognition using a moving window having a size selected by the user.

It is equally advantageous to define a spectral signature complex by both spectral and spatial criteria.

It is also advantageous to use an independent source as an additional factor to define a spectral signature complex.

It is advantageous to allow both a feature signature library and a rule set library to be an open system, tunable, modifiable, and updatable on the fly for real-time applications, and/or editable for non-real-time batch processing applications.

It is advantageous to use human language key words that are quantifiable and implementable for scene content/structure modeling and testing.

It is definitely advantageous to test competing implementations of a core data analysis routine, feature-signature model, and its corresponding visualization means.

It is also advantageous to use a dynamic GCP/image matching module to implement a real-time field-based situation awareness system in which a GCP is selectable and fine-tunable with interactive/automated plus evaluation and visualization means.

It is equally advantageous to generate a geogrid using a user-selected equi-distance projection center, such as one of the GCP, yielding a geogridded virtual Universal Transverse Mercator Equi-Distance system (VTM-ED) for a rapid field geospatial awareness application.

It is also advantageous to test the goodness-of-fit between a "camera" model and the ground truth, and devise a method to achieve a match within a predetermined level of confidence between the model and the actual reality, and also the base image versus the aligned image dynamically in the context of the control points and the control area.

Lastly, it is advantageous to perform automatic target recognition in the paradigm of time-varying image analysis, yielding an innovative system called Event-based Automatic Target Recognition (E-ATR).

Having said these advantageous aspects of this new invention, the current embodiment of this invention is now described as follows.

SUMMARY OF THE INVENTION

It is a primary object of the invention to feature a method for linking an object in a raw image representing a space comprising a number of pixels or from data representative of, the process consisting of creating a feature signature library containing at least one feature signature to convert pixels in a raw image into a feature-scene in which each pixel is associated with a feature signature by a quantifiable measure by applying at least one data analysis method. The data analysis method may consist of the following steps; creating a region of interest (ROI) spatial mask, creating a rule set library, and outputting an ROI linking result.

BRIEF DESCRIPTION OF THE DRAWINGS

For purposes of clarity and brevity, like elements and components will bear the same designations and numbering throughout the FIGURES.

FIG. 2b is an image showing the seventh input scene corresponding to FIG. 2a;

FIG. 3b is an image showing the tenth input scene corresponding to FIG. 3a;

FIG. 4 is a table showing a car crash event rule set;

FIG. 5 is a table showing a set of prior conditions for detecting an event;

FIG. 7 is a feature attribute table from scene two mask of FIG. 5;

FIG. 8 shows the first section of the linker file;

Figure 9:
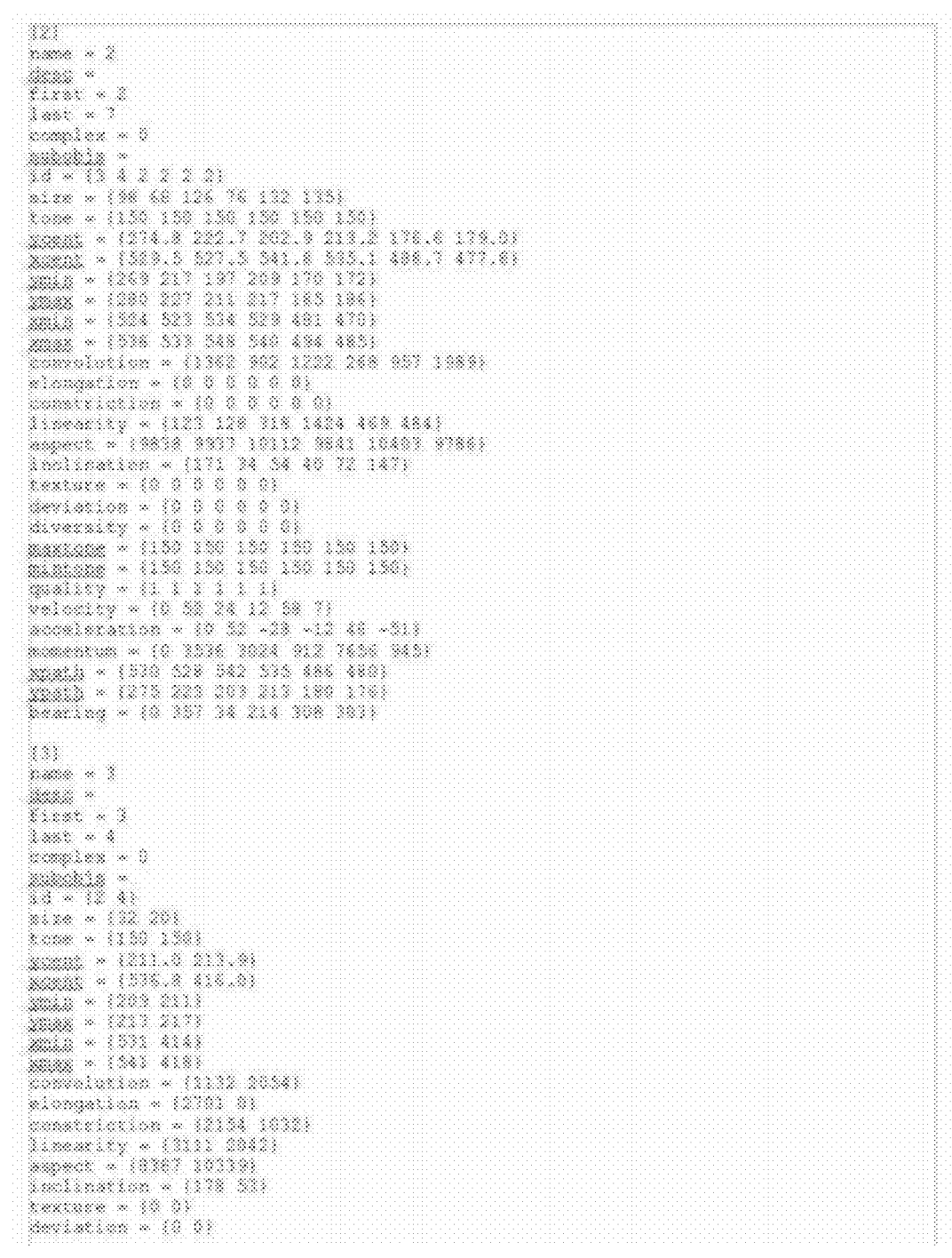

FIG. 9 shows the second section of the linker file;

FIG. 10 shows the third section of the linker file;

FIG. 15e shows system model #5: a subset of a bona file feature library;

FIG. 16c shows ROI-linking motion data for E-ATR database;

DESCRIPTION OF THE PREFERRED EMBODIMENT

In the above-noted SRE investigation sponsored by the Air Force Office Of Scientific Research (AFSOR), Hsu and Burright determined, by a perceptual test with 40 human subjects plus one machine decision, that when the test results are analyzed using a predetermined tone-texture model, about 50% of the subjects displayed a very good fit, 10% a good fit, 15% a moderate fit, and the remaining 25% showed either a poor or no fit. Such a high-degree (25%) of non-texture-tone based pattern recognition model employed by human subjects is consistent with the result of a 2006 study with 450 human subjects by Petite and Broek. For example, they noted that:

"Both color and shape did have a significant influence on the mutual agreement among the subjects, ranging from 78% (color—'shapeless'), to 60% (gray—'six-shape condition'). Using artificial clustering techniques we mimicked human's average texture classification in 80% (color—'shapeless') to 58% (gray—'six-shape condition') of the cases."

The result of the above two texture perception studies of human vs. machine indicates that the human visual system employs a non-texture analysis model for pattern recognition to a great degree, ranging from 20% to 42%. The Hsu/Burright experiment revealed further if one allows the perceptual data to cluster with 4 fixed dimensions and 4 free dimensions, the interpretable 8 dimensions comprise 80%, leaving 20% for "other than" Brightness, Texture and Structure based models as shown in Table 1.

TABLE 1

| | Perceptual Dimensions | | | |
|---|---|---|---|---|
| Dimension ID | 1 | 2 | 3 | 4 |
| Interpretation | Brightness | Texture | Structure | Other |
| Weight | 0.45 | 0.25 | 0.10 | 0.20 |

It has been well-established that the most distinguishable object structure is a binary structure with one object and its background, such as a white ball with a black background, or a reserved graytone pattern. A variation of the same theme is given in the classic 1969 presentation of perceptual psychology entitled "Sensation and Perception 1: Vision" by Jozef Cohen. The author noted that "The Gestalt Pregnanz principle requires that perceptions be of "good" shape." Therefore, one sees symmetrical diamonds (not component quadrilaterals) and superimposed "bell" designs (not component "waves"). (See FIG. 1-a)

Figure 1A:
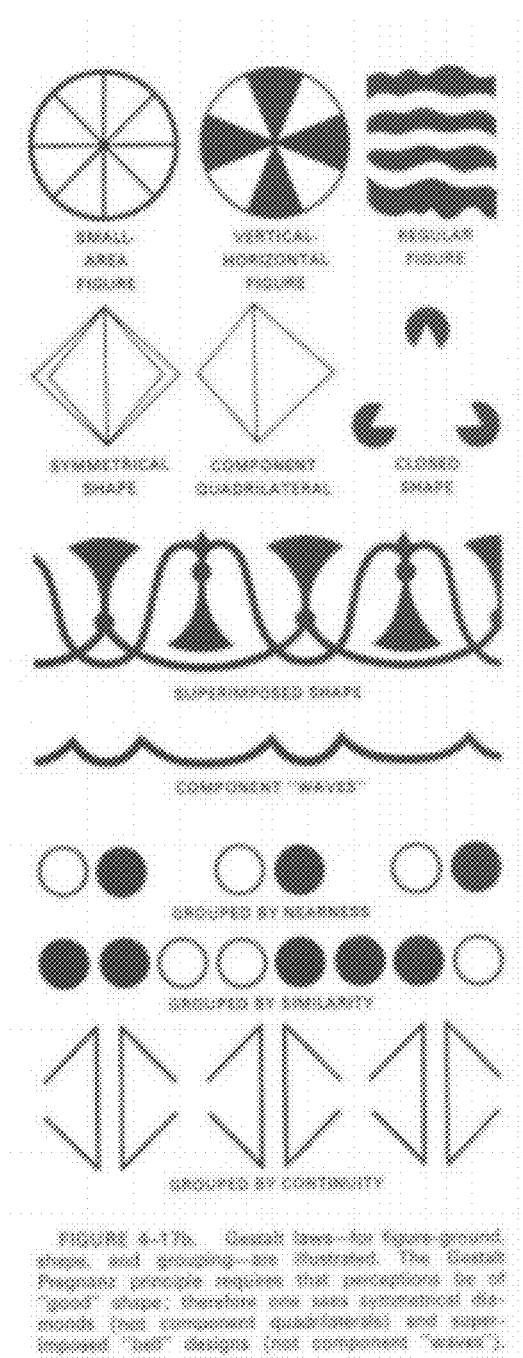
FIG. 1a is an image showing pattern recognition.
Figure 1B:
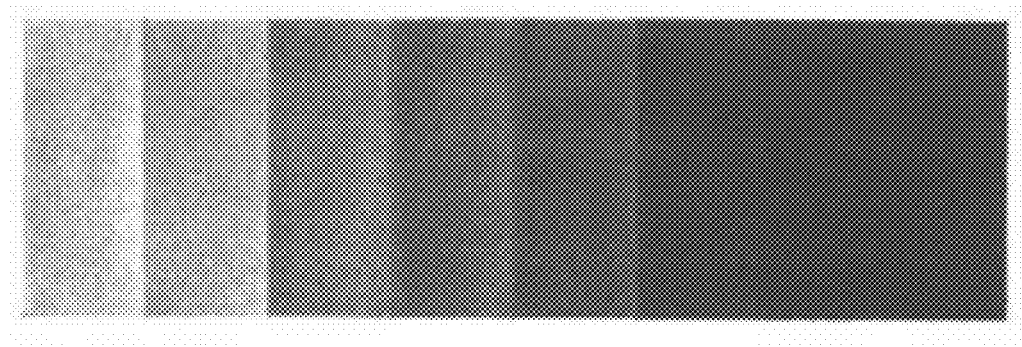
FIG. 1b is an image showing simultaneous contrast.

Another well-established perceptual pattern recognition principle is "simultaneous" contrast, using a set of discrete graytone patterns arranged from light to dark tones by a side-by-side fashion (FIG. 1b). The contact zone between two adjacent graytone patterns is perceived as having a higher degree contrast than that located not in the contact zone. The application of this perception phenomenon is to place objects as close as possible so that the human visual system can perceive minute difference between them.

The current innovation implements a machine-based image analysis system to create a condition under which an image analyst can readily employ either "figure ground" or "simultaneous contrast" perceptual principle or both as illustrated in FIGS. 1a and 1b for object/feature recognition.

From the above classic perception literature, the original Figure Ground structure is a two-tone mapping like a raster image. It was noted that the goal of sensing is to convert image data of 256 or more tones to information that can be represented by much fewer tones. For example in FIG. 1c a 256-tone SAR image is shown.

One of the most common tasks for objection extraction with SAR imagery is to find "small and bright object" like ground vehicles or man-made equipment. Therefore, object extraction principles for this task involve tone, texture, size and even shape criteria. The fundamental task-specific Figure Ground Structure is a two-tone image with the small-bright object as the figure. Since object extraction can be based on two or more criteria, the original Figure Ground structure can be constructed using three or more tones. This extracting "bright and small" object case serves as the theoretical base to extend the original Figure Ground structure from two-tone mapping to a generalized multi-tone mapping paradigm. The following examples illustrate the approaches.

Figure 1C:
FIG. 1c is an image of a Terra-X SAR Scene of Nordlingen, Germany.
Figure 1D:
FIG. 1d is an image of a figure ground structure from a two-tone mapping.

FIG. 1d is a two-tone mapping using one dominant feature signature. Specifically, the DN-value for figure is 50. Ground: DN=0.

Figure 1E:
FIG. 1e is an image showing a three-tone figure ground structure.

FIG. 1e shows a three-tone Figure Ground structure.

Compared to the original DN values, the above figure set has relatively dark pixels.

Figure 1F:
FIG. 1f is an image showing a five-tone figure ground mapping.
Figure 1G:
FIG. 1g is an image showing a six-tone figure ground mapping.

FIGS. 1f and 1g show a five-tone and a six-tone Figure Ground mapping, respectively.

Figure 1H:
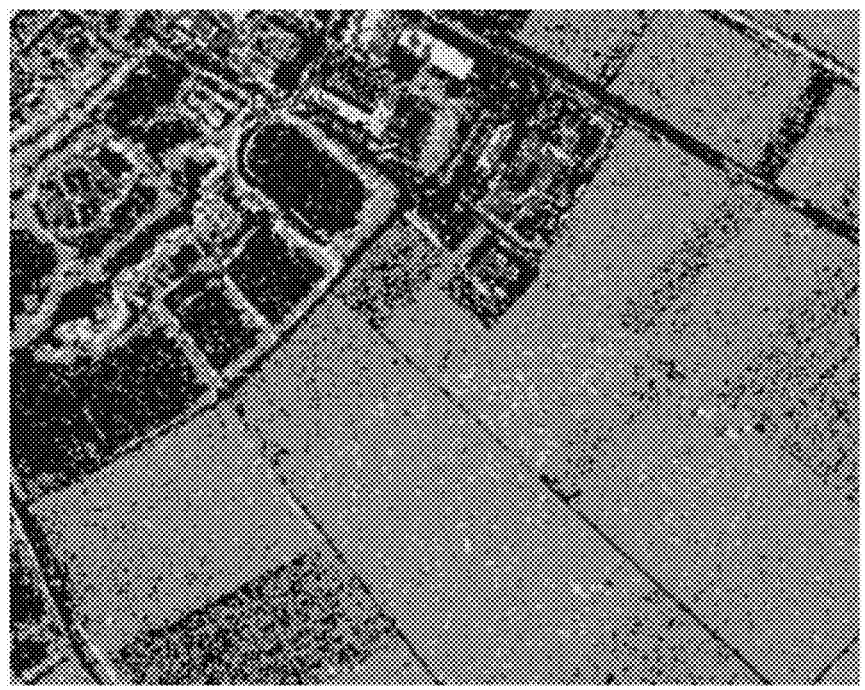
FIG. 1h is a color-coded six-tone figure ground structure.

Perceptual principles include color. Thus, it is logical to include color in a Figure Ground structure. For illustrative purposes, FIG. 1g is coded with five colors and FIG. 1h is similarly coded, adding Ground as black.

By checking against the original SAR DN values, the top three brightest feature signatures are coded in red, orange, and yellow, and the darkest as blue, and medium dark pixels as green. If the object extraction rule is to find the "bright-and-small" objects, the perceptual attention is directed toward clusterings of "Orange and Red." In order to also use Size and Shape criteria for Figure Ground mapping, it is necessary to rely on ROI masks and ROI descriptors.

Figure 1I:
FIG. 1i is an image showing an ROI mask using a bright-pixel feature signature.

FIG. 1*i* shows an example of a rule-set directed ROI mask. FIG. 1*i* itself is a bonafide Figure Ground structure.

Figure 1J:
FIG. 1j is an image showing object extraction By ROI masks and original SAR data.

Lastly, merge the original SAR data with the ROI masks for Object Extraction, as shown in FIG. 1*j*.

The red-coded regions in FIG. 1*j* meet the definition of "small and bright" objects. If the object extraction rule is to extract "farm equipment," then there is a need to use the green-code region in FIG. 1*h* as another ROI mask to extract them.

The above-noted Hsu & Burright and Petite & Broek studies point out the fact that human based object recognition has an inherent weakness due to individual difference and inconsistency, whereas its strength lies in the capability to see minute difference when attention objects are placed close to each other and to integrate surrounding patterns to derive a meaningful conclusion.

In a sharp contrast, a machine solution is perfectly consistent, but is limited in ability to incorporate context, and derive meaning.

Therefore, it is critical and advantageous for a machine system to deploy a high-quality solution, such as accepting only those pixels that are matched with a correlation coefficient greater than 0.90 for a human visual system based object extraction and recognition. For example, FIG. 1*c* is a perceptually unguided scene, whereas FIG. 1*i* is a perceptually-guided scene. Furthermore, FIG. 1*h* is a color-based perceptually guided scene.

In mathematics, a correlation coefficient is obtained from two columns of numbers, each column being a vector. The more elements in the vector the more reliable the correlation coefficient is. The rule of thumb is about 16 elements per vector.

In remote sensing, a typical investigation is recognizing a man-made object, such as a "road-related material," or a terrain feature, such as a "body of water." The task of creating a pixel-matching condition requires a pixel-vector and one or more feature vectors. Each vector requires a number of elements.

Using a hyperspectral sensor, where the number of spectral bands can be more than 100, there is no problem in having enough elements in the vector for match analysis. The challenge lies in the case where the number of input bands is as few as 1. Thus, the first task for the inventive system implementation is to generate enough elements in the matching vector with a given input imagery. While there are numerous ways to generate such a vector space, it should be noted that the system in the patent awarded to the principal present applicant is appropriate for this task as shown in Table XII of Hsu U.S. Pat. No. 6,741,744. Candidate band generation methods include but are not limited to "log," "SART" (square root), "Lopass33," "Meidan33," "Hipass33," "Iqnorm" (inter-quartile normalization), "Histeq" (histogram normalization), etc.

To generate a feature space for pixel match analysis, the second system component of the current invention creates a feature space which comprises a feature library and a set of corresponding pixel-matched "feature" scenes, in which each pixel is a quantitative mapping into one of the feature scenes.

Each element of the feature library is a feature vector representing a real or an artificial object. The element is a real feature if the vector is based on one real pixel or a set of real pixels, or an a priori feature vector. The element is an artificial feature if it is based on the contents of the input scenes and the number of features is user specified. The inventive system allows mixing of real and artificial feature vectors. The match criterion can be any appropriate closeness measure including but not limited to "generic distance", "correlation," or "vector/spectral angle."

Suppose that the proposed system generates 10 feature-matched scenes. One can use these 10 individual-feature scenes to perform object recognition by using a conventional thresholding method, such as keeping only the top 10 percentile pixels, yielding a system of 10 decision maps. Since one needs to examine through all 10 images, it is not a synergistic mosaic. Even though one can toggle through 10 images in a back-and-forth fashion, this presentation is merely a flicker based approach, not synergistic "figure ground" and "simultaneous contrast" based perceptual analyses.

To create a synergistic figure ground and simultaneous contrast effect, the inventive system inputs all 10 feature-match scenes in IMaG (as in Hsu 744) to generate a figure ground structure from each input scene, each based on a set of user-specified, tunable object selection criteria under IMaG. The match criteria can include matching level, size, shape and even associated features. Since it uses a high-quality matching criterion, the "figure" and the "ground" components of the perceptual system possess a quantifiable confidence measure.

The next step requires the user to composite the 10 figure ground structures into one mosaic by digitally coding each of the individual figure ground structures with 10 varying digital numbers. By color coding each digital number, one generates a color-composite of a mosaic of multi-faceted figure ground structure for object recognition. FIG. 1*h* is such an example.

The above discussed system uses still remote sensing imagery as an input. The present inventive system, however, is capable of ingesting video imagery for object/feature extraction and linking. Unlike still remote sensing imagery, video images comprise numerous time-varying images acquired at the rate of greater than 30 frames per second. Thus, they are ideal for detecting moving objects that may lead to "event" detection based on detected changed-object patterns over time.

With moving objects embedded in relatively still background features, the contents of video imagery can be conceived of having two object subsets: (1) moving objects and (2) their background features. Therefore, there exist at least two possible approaches to analyze the contents of video images: (a) treating all objects and features as one class, and (b) extracting the moving objects first and then associating them with the individually-extracted background features. The following sections discuss the implemented inventive system for these two complementary approaches.

For simplicity, consider designating 30 time-varying images as Scene-001 through Scene-030. Using the above-discussed concept of using a set of "dominant features" to characterize an image, Scene-001 is characterized by Scene-001-dominant-features, and Scene-002 is characterized by Scene-002-dominant-features, and so on. If there is little change between Scene-001 and Scene-002, the characteristics of Scene-001-dominant-features are practically the same as those of Scene-002-dominant-features.

Each dominant feature is represented by (1) a feature signature library, and (2) corresponding feature-based scenes. For intuitive naming, the invention uses a key-word-coded feature signature library to represent a set of dominant features. The elements of a feature signature library are composed of at least three possible feature signature sets: (a) labeled signatures representing real-world features, (b) artificial feature signatures or "others" derived from the existing scene-contents mathematically, and (c) unknowns. It should be noted that any Other-category signature can be converted to a labeled signature by comparing it against the ground truth, or correlating it to a set/library of labeled signatures.

Beginning a feature extraction analysis from Scene-001 generates a set of "dominant" feature signatures, and stores them in Scene-001-library. If there is no a priori knowledge about the characteristics of features in Scene-001, the Scene-001-library is entirely filled with a set of artificial features denoted as "Others." If 10 features are used by the image analyst, the number of library elements is 10. Symbolically, Scene-001 content is denoted as "Scene-001-Library-Other-10." Similarly, Scene-002 is denoted as "Scene-002-Library-Other-10."

If after analysis of the dominant feature signatures, 5 are labeled, a signature library with the following configuration would yield: "Scene-001-Library-Labeled-5-Other-5."

If there is no change between Scene-001 and Scene-002 within 1/30 of a second, the characteristics of Scene-001-Library-Other-10 are practically the same as those of Scene-002-Library-Other-10. A simple correlation analysis using a confusion matrix detects whether there is a change in scene content as video imagery progresses from Scene-001 to Scene-002, and so on.

The sum of the components reflected in the designation "Scene-001-Library-Labeled-5-Other-5" forms a scene content modeling and testing system using a symbolic key word representation and implementation.

Suppose that Scene-001-Library is treated as the master feature-signature library, denoted as Scene-Library-Master-Time-001-Other-10, or Scene-Library-Master-Time-001-Labeled-5-Other-5. Suppose again that two new feature signatures were detected as Scene-i progressed to Scene-j, where i=001, and j=002. Then the two feature signatures are entered into the master library, yielding an updated feature library that can be symbolically denoted by key words as:

$$\text{Scene-Library-Master-Time-002-Labeled-5-Other-7} \quad (1)$$

Again, Equation (1) is a hypothesized scene content model for testing, fine-tuning, updating, and deriving an optimal model for system implementation for a particular real world application.

It was noted that for each feature signature there exists a corresponding feature-based scene in which each scene pixel is mapped as a digital number (DN) representing a degree of association between the pixel and the feature signature in multi-feature configuration environment. To generate a figure ground structure, the process simply required entering all the feature-based mapping scenes into IMaG, using a rule set to first define a figure ground structure for each input scene, and then compositing all the rule-set defined figure ground elements into one super figure ground mosaic.

With this DN-value coding system, the figure component pixels are coded with non-zero DN values, and the ground component pixels are coded with DN=zero. Unknown feature pixels are designated with a DN value of zero.

Using the IMaG system, the user can output any "unknown-feature" pixels as an image layer, where the Unknown-DN-value=255, and the remainder are DN-value=0.

To recover the original DN values of the Unknown features in video images, use the above IMaG output scene as a mask to discover the original DN-values from the corresponding video scene (prior to figure ground generation). The result of pixel-masking analysis is a reverse feature extraction process by which the DN-values of the Unknown set become known, and the rest of the pixels become the background set with R/G/B DN-value=0.

Following Equation (1) scene content representation, by adding Unknown as a feature category, there would be the following key word based scene-content-model for testing and implementation:

$$\text{Scene-Library-Master-Time-002-Labeled-5-Other-7-Unknown-x} \quad (2)$$

To generate a feature signature library from the Unknown-Set masked video images, the masked video scenes are treated as a new set of input images. Once all the feature extraction analyses have been completed, the result is a similar scene feature library as Equation (2), above. The only difference is that for this cycle, the input pixels with real-world DN values are from the Unknown Set. Thus, Equation (3) can represent the final result as follows:

$$\text{Unknown-Library-Master-Time-001-Labeled-x-Other-y} \quad (3)$$

It is possible that there are Unknowns in the original Unknown Video images. For a generic representation, Equation (4) shows:

$$\text{Unknown-Library-Master-Time-001-Labeled-x-Other-y-Unknown-z} \quad (4)$$

The unknown set mask was generated as residuals from the existing scene feature library. With video imagery, it is possible to extract the pixels of the moving objects, and treat the rest of the pixels as a super background. In this case, the input to the current invention comprises a moving-object mask and the corresponding video imagery from which the mask was generated, or independently supplied.

Once the moving object mask is given, the background mask is the complementary mapping set.

From the background mask, all the feature element values are generated from the background pixels. From these background-only pixels, there is generated a feature signature library. The resulting scene-content structure can be represented by Equations (5) and (6) as a generalization from Equation (4).

$$\text{Moving-Object-Library-Master-Time-001-Labeled-x-Other-y-Unknown-z} \quad (5)$$

$$\text{Super-Background-Library-Master-Time-001-Labeled-x-Other-y-Unknown-z} \quad (6)$$

For any remote sensing imagery, an ROI may not be limited to only moving objects. In general, any region can be an ROI. Thus, a generic-region-subsets mask with multiple ROIs is the best solution for all users. To this end, the inventive system accepts such a multi-ROIs mask as a complementary input to the original video imagery set. After all the object-feature extraction is performed, a generic scene-content feature signature library is set as follows:

$$\text{ROI-subsets-Library-Master-Time-001-Labeled-x-Other-y-Unknown-z} \quad (7)$$

$$\text{Background-subsets-Library-Master-Time-001-Labeled-x-Other-y-Unknown-z} \quad (8)$$

Equations (7) and (8) constitute a scene content representation, as well as a model for testing, where a scene is partitioned into two broad categories: (1) ROI and (2) Background. Within each super category, multiple subsets area allowed. For each subset, there is a feature signature library.

In Equations (7) and (8), there are two sets of feature libraries: (a) the Master Library that includes all features of interests, and (b) the Subset Library that represents only a particular ROI from a set of the multi-subset mask. Logically, when the processing is all done, the feature signatures in a masked subset are a subset of the feature signatures in the Master Library. Without further analysis, it is not known which feature in the Master Library can best represent a particular ROI. It is also possible that a particular ROI can best be represented by multiple feature signatures. The current invention allows such a multiple-feature(s) representation of an ROI, each representing a fraction of the total pixels in the ROI. Symbolically, such a sub-feature representation of an ROI is given in Equation (9).

ROI-001-Library-Master-Time-001-feature-001-
n1% . . . -feature-xyz-nn % (9)

Where,
Feature-001 has n1% of the total pixels,
Feature-002 has n2% of the total pixels, and lastly
Feature-xyz has nn % of the total pixels.
Then, n1%+ . . . +nn %=100%.

Since the degrees of association of each pixel in the ROI with all feature signatures are known, assignment of a given feature to that particular pixel is done by a ranking rule.

The IMaG system disclosed in U.S. Pat. No. 6,741,744, gives a means to assign a set of descriptors to an ROI as shown in TABLE XII (744) including Size, Maxtone, Mintone, Texture, Diversity, Linearity, Convolution, Constriction, Aspect, Inclination, Rcent, Ccent, Rmax, Rmin, Cmax, Cmin, and other spatial association features. Therefore, for each ROI, one can attach a set of descriptors for each time period in a video imagery stream. Symbolic representation of the ROI descriptor as a subset of a scene contents is given in Equation (10) shown in Table 3.

TABLE 2

| Region of Interest (ROI) Descriptors | |
|---|---|
| 1 | Region ID |
| 2 | Size |
| 3 | Rcent |
| 4 | Ccent |
| 5 | Rmax |
| 6 | Rmin |
| 7 | Cmax |
| 8 | Cmin |
| 9 | Linearity |
| 10 | Convolution |
| 11 | Constriction |
| 12 | Elongation |
| 13 | Aspect |
| 14 | Inclination |
| 15 | Texture |
| 16 | Deviation |
| 17 | Diversity |
| 18 | Maxtone |
| 19 | Mintone |

TABLE 3

| ROI Descriptor Of Video Imagery Stream | |
|---|---|
| ROI-001-Descriptor-Time-001 | (10-001) |
| ROI-001-Descriptor-Time-002 | (10-002) |
| ROI-001-Descriptor-Time-xyz | (10-xyz) |

If a given video frame is given as a mask, 30 frames produce 30 masks. In addition, for a given video frame there may be n ROIs. The number and location of n ROIs can vary from one video frame to the next. Using n=100, Equation 10 in Table 3 is a representation of Equation (11) in Table 4.

TABLE 4

| 100 ROIs with Descriptors In Time-001 | |
|---|---|
| ROI-001-Descriptor-Time-001 | (11-001) |
| ROI-002-Descriptor-Time-001 | (11-002) |
| ROI-100-Descriptor-Time-001 | (11-100) |

Equation (12) in Table 5 is a representation for Time-002, and Table 6 Equation (13) for Time-030.

TABLE 5

| 100 ROIs with Descriptors In Time-001 | |
|---|---|
| ROI-001-Descriptor-Time-002 | (12-001) |
| ROI-002-Descriptor-Time-002 | (12-002) |
| ROI-100-Descriptor-Time-002 | (12-100) |

TABLE 6

| 100 ROIs with Descriptors In Time-030 | |
|---|---|
| ROI-001-Descriptor-Time-030 | (13-001) |
| ROI-002-Descriptor-Time-030 | (13-002) |
| ROI-100-Descriptor-Time-030 | (13-100) |

By applying the above-discussed scene-content modeling and testing methodology from still imagery to time-varying imagery, the inventive system uses ROI masking and linking approaches to model the contents of a stream of scenes for testing and system implementation to derive an optimal solution. Two applications with video images are demonstrated.

First, assume that input video images have been acquired from a relatively stationary video camera.

With a relatively stationary video camera system, the ROIs in adjacent video scenes are generally stationary except for those belonging to moving objects. Since video images are taken at the rate of greater than 30 frames per second, the displacement created by a moving object in adjacent frames is relatively small. To determine a displacement distance, "identical object pairs" in adjacent video frames must be determined first. For this task, an object pair matching is created by using two sets of ROI ID and Descriptors. For example, for each ROI in Time-001, one can match it to all ROIs in Time-002 by computing a distance set using the ROI Descriptors. The end result of this ROI matching analysis is a classic confusion matrix (Table 7), from which a match is determined by the minimum distance ROI pair as symbolically shown in Table 7 and Equation (14).

TABLE 7

| Confusion Matrix For ROI Matching & Linking | | | | | | |
|---|---|---|---|---|---|---|
| $d_{ij}$ | | | Time-1 | | | |
| Time-2 | ROI-1 | ROI-2 | ROI-3 | ROI-4 | . . . | ROI-n |
| ROI-1 | $d_{ij}$ | $d_{ij}$ | $d_{ij}$ | $d_{ij}$ | | $d_{ij}$ |
| ROI-2 | $d_{ij}$ | $d_{ij}$ | $d_{ij}$ | $d_{ij}$ | | $d_{ij}$ |
| ROI-3 | $d_{ij}$ | $d_{ij}$ | $d_{ij}$ | $d_{ij}$ | | $d_{ij}$ |
| ROI-4 | $d_{ij}$ | $d_{ij}$ | $d_{ij}$ | $d_{ij}$ | | $d_{ij}$ |
| . | | | | | | |
| . | | | | | | |
| ROI-n | $d_{ij}$ | $d_{ij}$ | $d_{ij}$ | $d_{ij}$ | | $d_{ij}$ |

Match is located at the cell with $d_{ij}$ as row minimum or column minimum.

Track-001-Time-001-to-Time-002=ROI-i-of-T1-
linked-ROI-j-T2, where $d_{ij}$=min, for all $d_{ij}$'s to
establish an ROI-pair (14)

It is possible that from Time-001 to Time-002, each ROI has a Link. If there is no movement for a given Linked ROI-pair, the corresponding dij is practically zero, but usually not exactly zero due to noise or a minor ROI centroid offset. For a real movement-based offset, the dij must exceed a user-defined minimum threshold, such as a distance of 5 pixels.

Assume that an ROI link is established with 30 successive video frames, there are 29 distances to establish a set of motion descriptors, including but not limited to the following measures as given in Table 8.

TABLE 8

Extended ROI Descriptors Based On Motion Over Time

| 1) | velocity |
| 2) | acceleration |
| 3) | momentum |
| 4) | xpath |
| 5) | ypath |
| 6) | bearing |

Table 8 descriptors are labeled as Extended ROI Descriptors of Table 2.

When a video camera is mounted on an air vehicle, the camera is relatively non-stationary. Since all the objects/features in these video frames appear to be "moving," it is much more difficult to link ROIs over time as compared to the case where the camera is stationary. However, the ROI matching method, using confusion matrix analysis (Table 7), based on the ROI descriptors, is still fundamentally valid. The difference lies in a larger dij in the confusion matrix, making it difficult to determine the physical meaning of each dij for motion analysis.

To eliminate confusion between stationary background features and real moving objects acquired by a non-stationary video camera, it is a good idea to extract out only moving objects if the task can be done using more sophisticated camera model and other appropriate approaches.

If such a sophisticated camera model is not available to mask out only the moving objects, it is still possible to mask out a limited number of ROIs from each video frame using IMaG based rule sets based on the ROI descriptors plus spatial association rules in U.S. Pat. No. 6,741,744. Table XII. For example, if the ROI is a car, it is possible to use a priori Size and Shape rules to mask them out.

With generic time-varying imagery, the scene content which can be related from one frame to the next is relatively unstable. The inventive technology exploits the stable components of the time-varying imagery for scene content modeling. More importantly, the current invention uses quantifiable measures to determine and subset the degrees of stability among all ROIs. Thus, the invention models the scene contents of time-varying imagery with a system of overlapping, relatable feature-signatures as if they were moving windows. ROI Linker is a subset of this system that strings "similar ROIs" over time for object extraction, visualization and Event detection.

While an event is a physical phenomenon in video imagery, detection of an Event is largely a rule-based analysis. Such a rule-based analysis can be applied to an object-coupled data set from video frames acquired from a stationary video camera, and ROI-Linker data set from video frames acquired from a moving video camera.

First, mask out a set of ROIs from each "Car Crash" video image, and output a set of ROI descriptors for each ROI in each video frame. The descriptors are essentially those in Table 2.

Figure 2A:
FIG. 2a is an image showing linked ROI data from video frames with a stationary camera.
Figure 2B:

Using the confusion matrix approach illustrated in Table 7, each ROI set is linked over time as illustrated in FIG. 2a. In fact, FIG. 2b is a figure-ground structure of the original input scene shown in FIG. 2a.

In FIG. 2a, each of the blue and yellow lines is a link over time. At the NE quadrangle, see car ID 18 and ID16, each having a link derived from a number of successive video scenes.

Suppose that ROI-16 has moved from NE toward SW, whereas ROI-18 has moved from SE toward NW. Over the next video frames, it is possible that ROI-16 crashes into ROI-18. "A crash" or "not a crash" can be determined only when a set of linking measures has met a set of pre-determined quantitative rules. For example, if one of the crash rules is that the minimum distance between the centroid of ROI-18 and ROI-16 is 5 pixels, then that "<5 pixels" rule much be achieved by dij (distance) between ROI-18 and ROI-16 centroids for a "crash" call. Similarly, another crash rule can be that "the angle between two candidate tracks must be greater than 5 degrees," which is essentially a "non-parallel" linking rule. When all the rules are met, it is labeled a "crash" as graphically shown in FIG. 3a.

Figure 3A:
FIG. 3a is an image of a graphic representation of a car crash event.
Figure 3B:

In FIG. 3a, ROI-16 and ROI-18 form a complex object with multiple labeled subsets, which is another "crash rule." Here, graphically, the complex object is also marked by a red box to meet a "crash call." FIG. 3b is the original input scene corresponding to FIG. 3a.

In FIG. 3b, one can see the car crash, which is shown in FIG. 3a by "touching" of ROI-16 and ROI-18, and is also indicated by a Red Box symbolizing a complex object.

For the above real world example, the crash event rule set or criteria are those listed in FIG. 4.

Earlier a mask was defined as a set of imagery in which a subset is used as a template to extract the DN values of the pixels from the other subset. The simplest mask is a binary graytone image where the DN value of the ROI is coded as 255, and the rest as background with DN-value=0.

Therefore, if all the moving objects in each video frame have been masked out, ROIs can be linked, using similar methods shown in FIGS. 2 and 3. For each masked-subset, a set of ROI descriptors can be built for each ROI in each video frame for object extraction and database construction. The ROI descriptors include both the ROI feature attributes listed in Table 2 and the ROI motion attributes in Table 7.

The database itself contains the fundamental information for Event/Activity detection, particularly when the video frames are acquired from a non-stationary video camera.

Although it is not easy to mask out the "moving" objects in video frames acquired from a moving video camera, it is still possible to mask out the ROIs that can be identified as having certain unique spectral and spatial attributes, such as size, shape, and associated features.

For this current invention, both object linking shown in FIGS. 3, 4, and 5, and data mining from object attributes listed in Tables 1 and 6 are used to detect Event and Activity in video frames. Since the object linking approach has already been illustrated, the data mining approach is discussed only with a real world example.

Suppose an Event or Activity is defined in video frames as "opening the right-hand-side car door." Then, a set of a priori conditions must exist for detecting such an event as listed in FIG. 5.

Once these a priori conditions are defined, the next step requires completing the ROI masking and building the corresponding database. A data mining approach from a database based on Tables 2 and Table 7 ROI attribute list is shown next.

Figure 6:
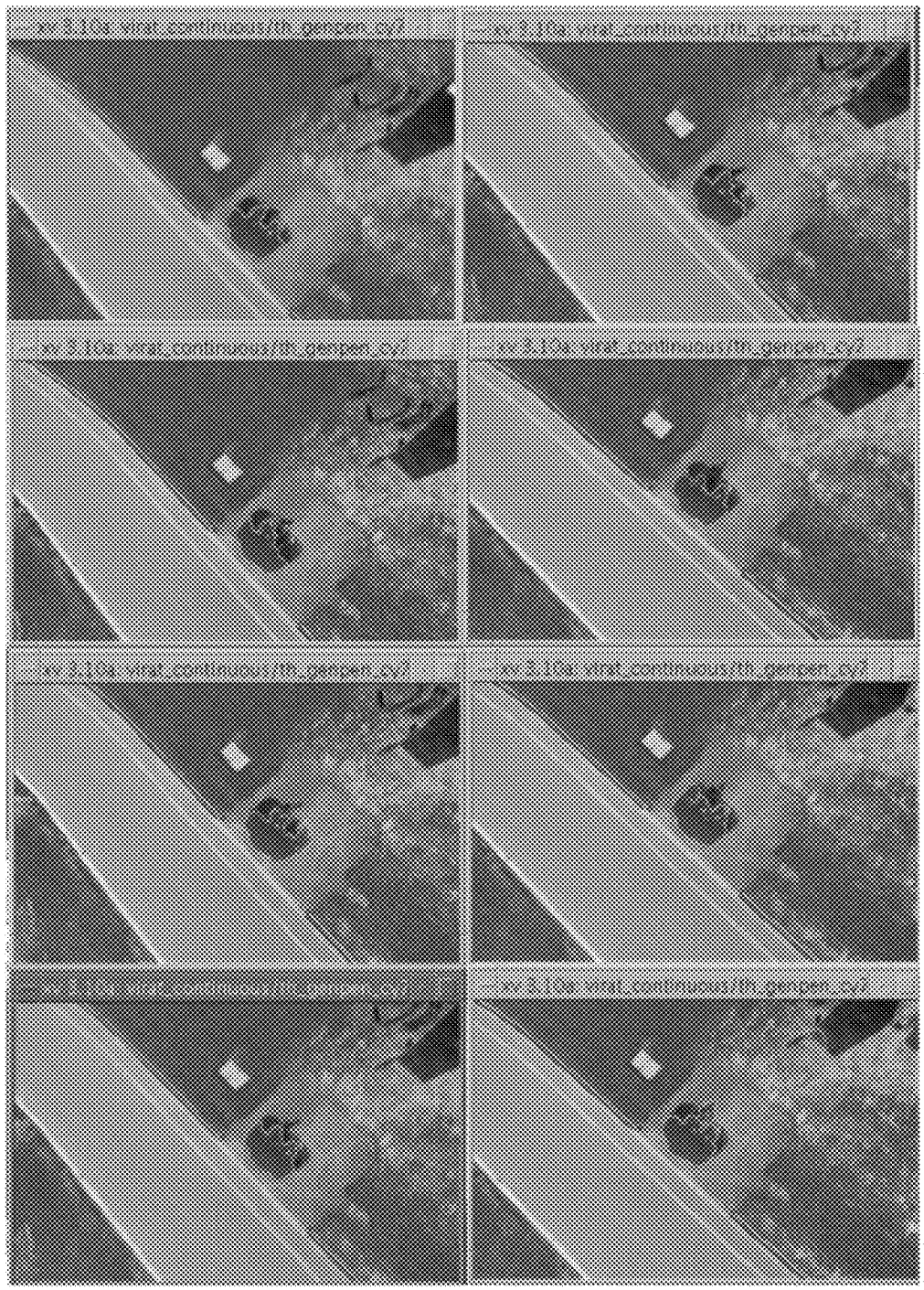
FIG. 6 is an image showing a series of masks for video frames from a non-stationary imaging source.

To illustrate the approach, eight continuous video frames were used to establish a sample link, similar to a mathematical "graph" in which each frame has two masks, one for car ROI, and another for door ROI in FIG. 6.

Each mask is a raster image. The "CAR ROI" is coded DN=100, and the "DOOR ROI" pixels are coded DN=150.

From each mask, a feature attribute table is generated, and the eight attribute tables constitute a database. For illustration purposes, only the second attribute table in FIG. 7 is shown.

Column A is ROI ID, and the rest of descriptors corresponding to those given Table 2. Specifically, it should be noted that in Column C, the DN=0 is for the ground set. DN=100 is for CAR ROI and DN=150 is for CAR DOOR ROI. Column B is Size. With Size and Tone (Column C) together, similar objects can be linked in the eight masks in FIG. 5.

Figure 7:
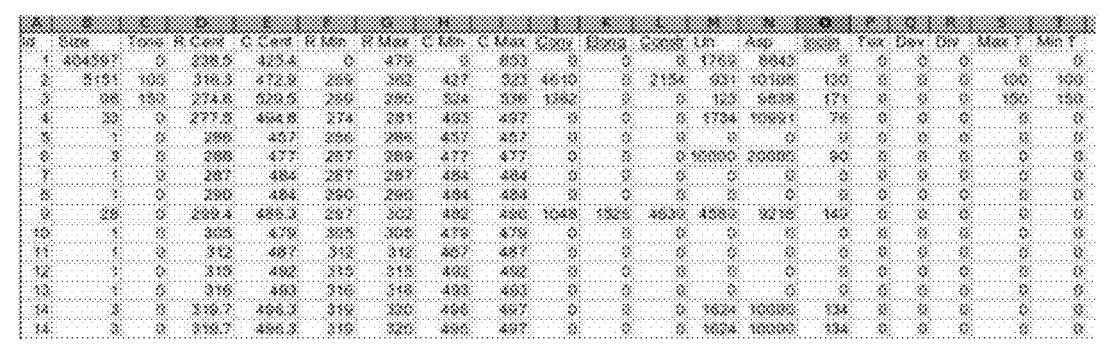

The implemented ROI linker is first based on the data shown in FIG. 7 or Table 2. For this example, the current linker is based on only Size and Tone criteria in the context of a confusion table shown Table 2. The result of a link analysis is a linker file, which shows a linkage of "similar objects" over time, which was referred to as the stability property between adjacent frames. The linker files use eight attribute tables—FIG. 7 is #2 file—are shown in FIGS. 8, 9 and 10.

Figure 10:
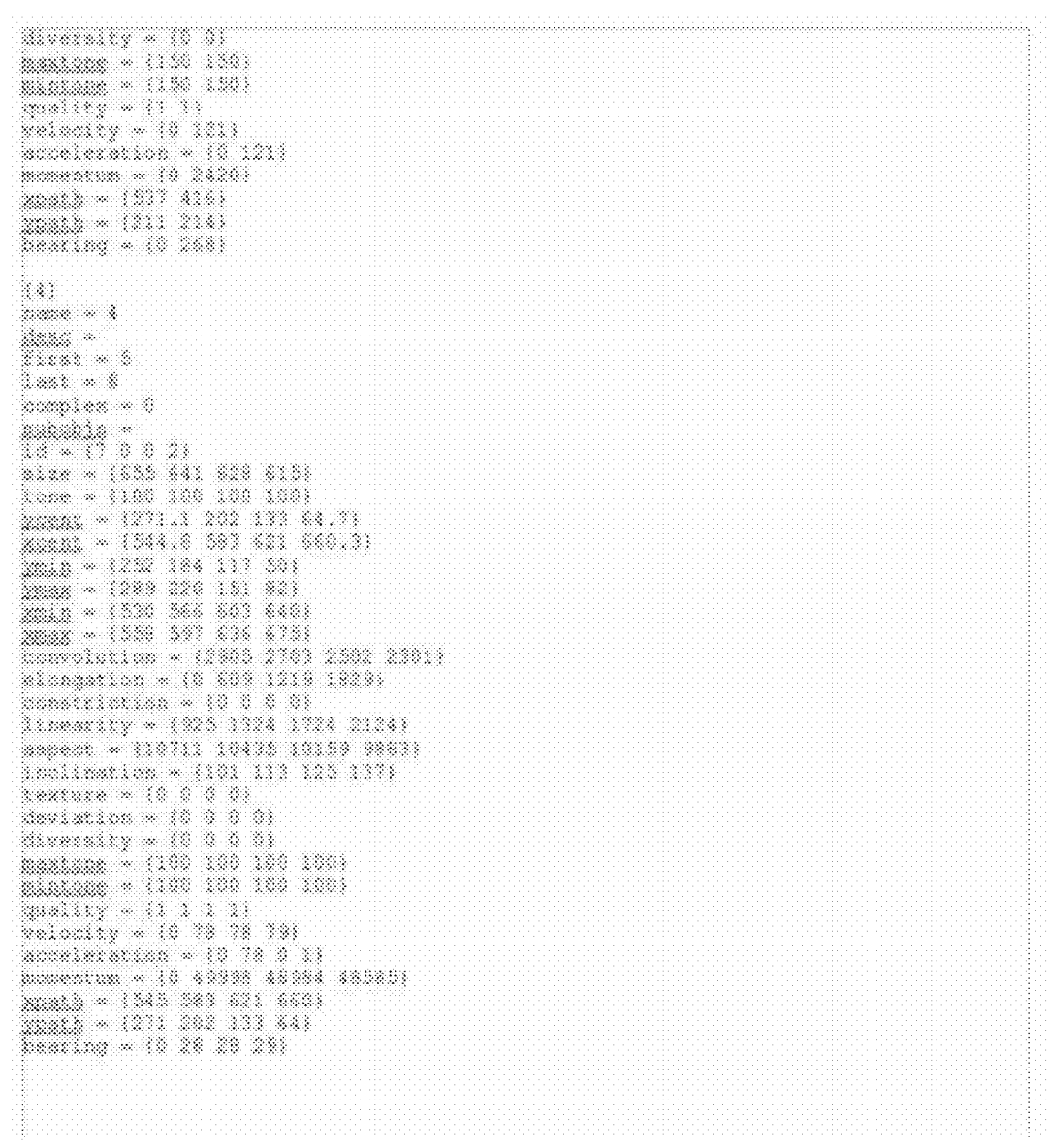

From FIG. 10, it is shown that first, all the applicable data in the attribute tables are used to describe a given linker ROI, and second, derived ROI descriptors on motion are added: they are Velocity, Acceleration, Momentum, Xpath, Ypath, and Bearing.

Figure 8:
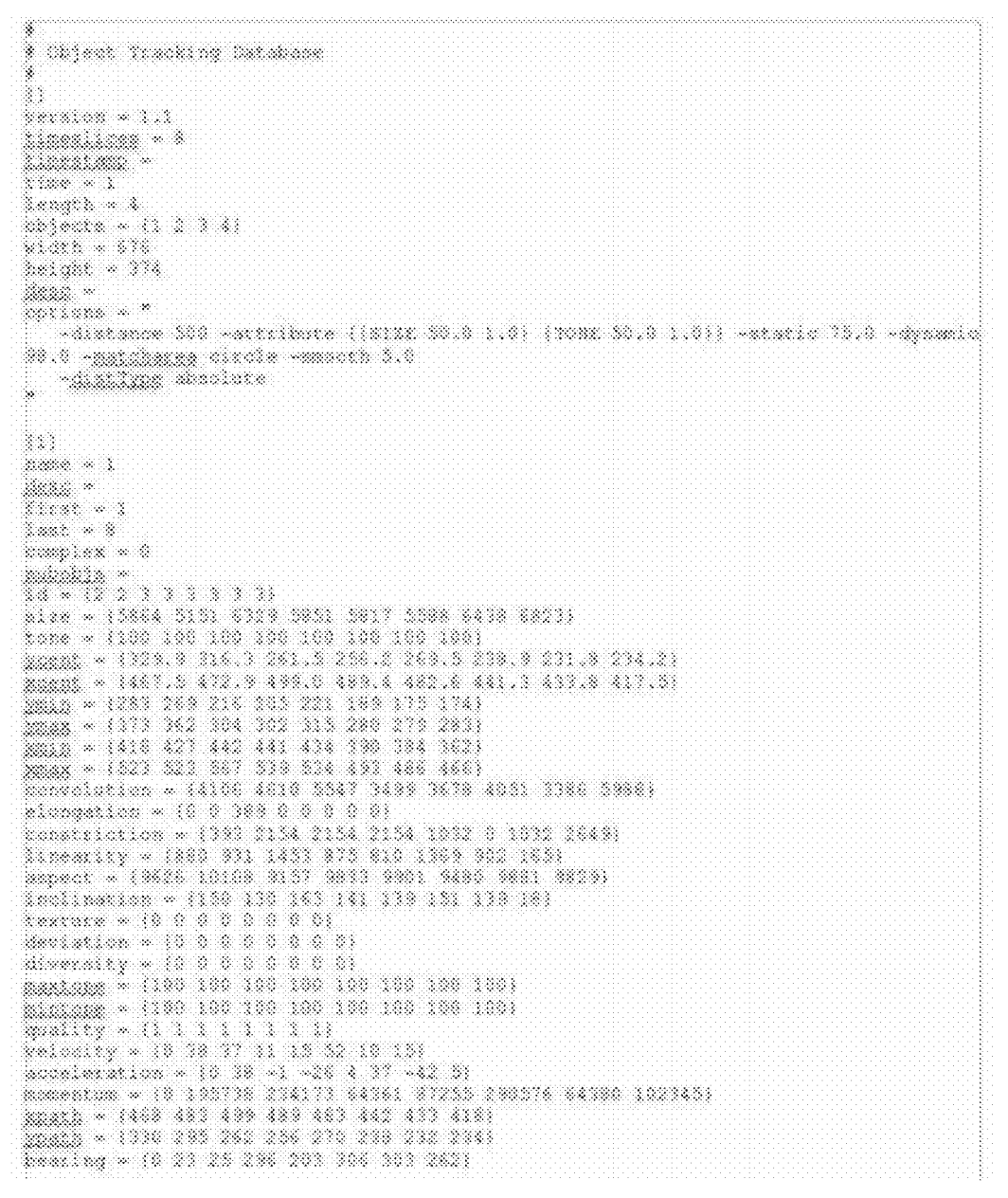

At the beginning section of FIG. 8, the characteristics of the first linker ROI in [1] are shown. Below [1], shown in Table 9:

TABLE 9

Section of The Linker File Data

| subobjs | Frame-2 | | | | | | | |
|---|---|---|---|---|---|---|---|---|
| id | 2 | 2 | 3 | 3 | 3 | 3 | 3 | 3 |
| size | 5851 | 5151 | 6329 | 5851 | 5817 | 5588 | 6438 | 6823 |
| tone | 100 | 100 | 100 | 100 | 100 | 100 | 100 | 100 |

Table 10 is created from row 2 of FIG. 7, attribute table for Frame #2:

TABLE 10

Section of Frame 2 Attribute Table

| Id | Size | Tone |
|---|---|---|
| 2 | 5151 | 100 |

Figure 11A:
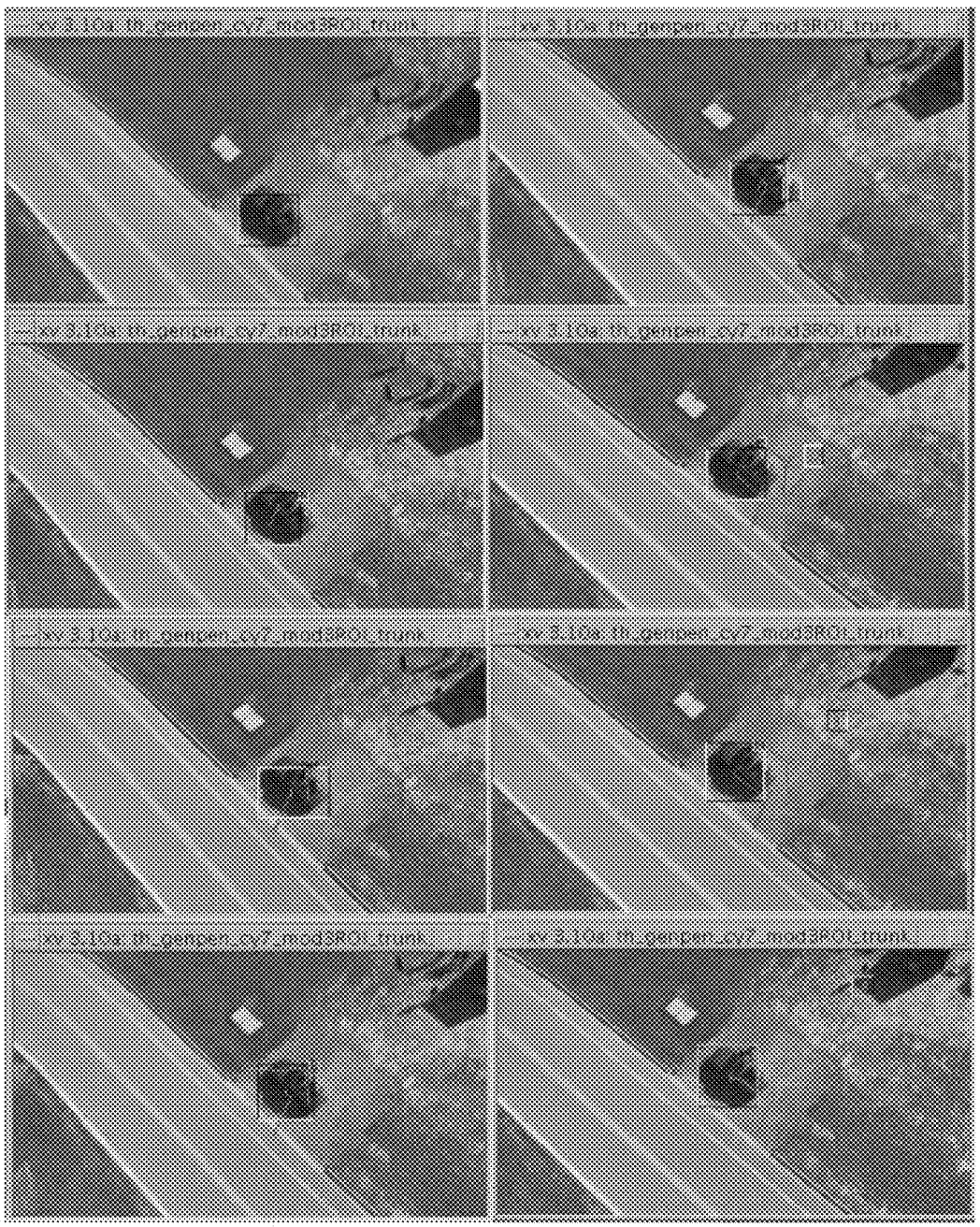
FIG. 11a is an image showing the graphic representation of the linker file.

Note that the Row data of "id" of Table 9 is the linkage of the tracked ROI over time. Thus, 2-2-3-3-3-3-3-3 series means ROI-id=2 in Time-1 is linked to ROI-id=2 of Time-2, and then linked to ROI-id=3 in Time-3. The corresponding graphic representation of the result is given FIG. 11a. The set 2-2-3-3-3-3-3-3 series is referred to as a stream of "moving windows" that reveals only the stability property of the video frames.

The order of the linker series is also top to down and left to right. Upper left frame is Time-1, and below it is Time-2. Right-top frame is Time-5 and so on.

The Time-1 frame has a box with a numeric character of 1, symbolizing link set [1].

In Time-2 frame are two boxes, symbolized by [1] and [2]. Thus, there are two ROIs at the beginning of Time-2. This is consistent with Frame #2 of FIG. 6 that has two masks.

The most interesting ROI links are in Time-6, and Time-7, where there is seen two essentially parallel link sets, one of the CAR ROIs, and the other for the DOOR ROIs over time.

It is known that CAR ROIs are NOT really moving over time, and the DOOR ROIs moved slightly over time. However, these links represent substantial movement of both over time. Therefore, the "movement" is largely caused by camera movement, not object movement. The link sets themselves may indicate how the camera has moved over time.

Figures 11B, 12:
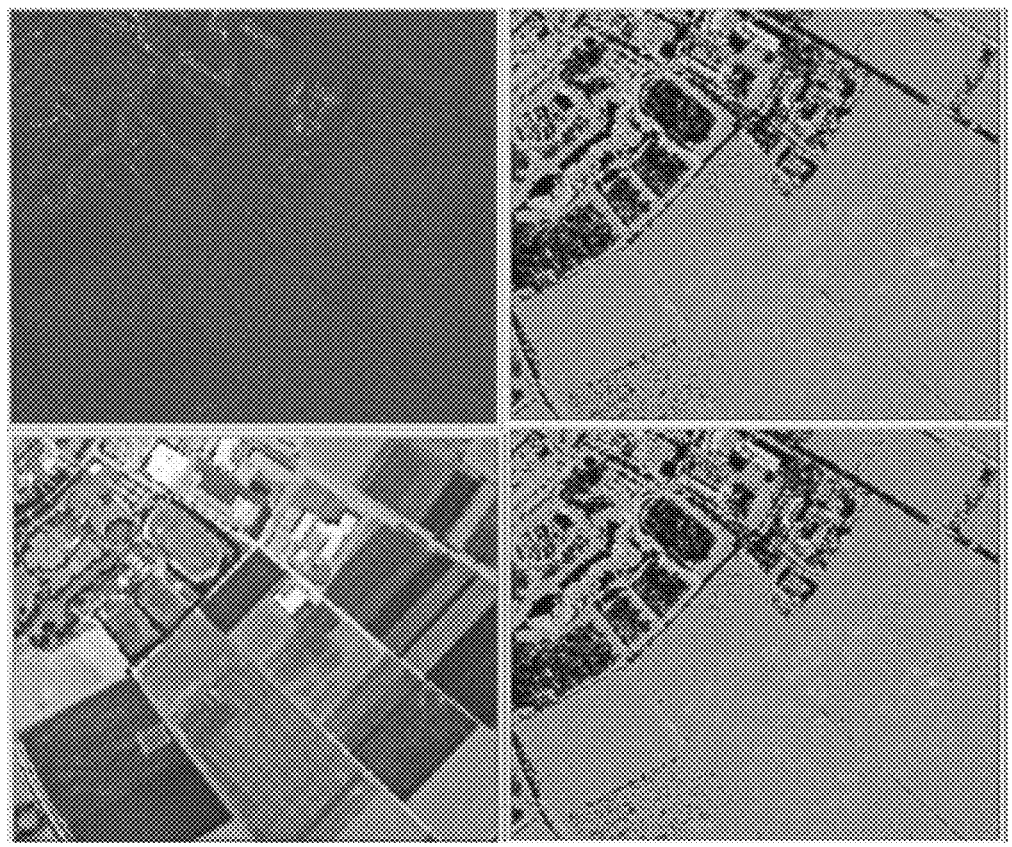
FIG. 11b shows a door open rule set based on relative orientation data.
FIG. 12 is an image that depicts using single SAR to generate five-color figure ground structure.

Using the relative ROI descriptors of the car and the door, a rule set is created, which models an event/activity—"car door opening/closing" as shown in FIG. 11b.

The data in FIG. 11b are extracted from the data in FIGS. 8, 9, 10 containing the ROI descriptors. The descriptor of interest is "Inclination" representing the orientation of the long axis of the corresponding ROI. The inclination data ranges from 0 degrees for the 3 o'clock direction to 180 degrees for the 9 o'clock direction. As shown in FIG. 6, upper right scene, the orientation of the car-body is towards NW direction; thus, its inclination is about 130 to 160 degrees, and the orientation of the car door is toward NE. Thus its inclination is about 30 to 70 degrees. Therefore, when the car door is open, one Event detection rule can be the relative difference in orientations "between 70 to 160 degrees," like a "wide-open V-shape configuration."

Another rule can be the distance between the Car-body and the Car-door is "less than 10 pixels."

The third rule can be a set of parallel tracks.

The above database analysis demonstrates the advantageous aspects of the invention in exploiting the stability characteristics of ROIs and feature signatures between adjacent time-varying frames to model generic scene content. The ROI Linker program is a subset of the quantifiable, testable, and implementable system which models scene content over time.

In addition, the above case study demonstrates that the inventive technology is capable of performing Event detection with video data even when the camera position is not stationary.

The following sections demonstrate the capability of the invention with generic image data.

FIG. 12 demonstrates the capability to transform relatively-poor visible SAR imagery into a 5-class color coded imagery.

Note that features and objects in the original Terra-SAR (NW Quad) are barely visible. The SW Quad image is the area as extracted from Google Earth. The right-hand-side images are a 5-color representation of the original SAR data. The progression of colors from red-orange-yellow-green-blue, correspond, but are not a direct mapping of SAR intensity return.

For this example, the inventive system models the SAR scene content using five dominant feature signatures in the paradigm of perceptually effective figure ground structure and simultaneous contrast.

Figure 13:
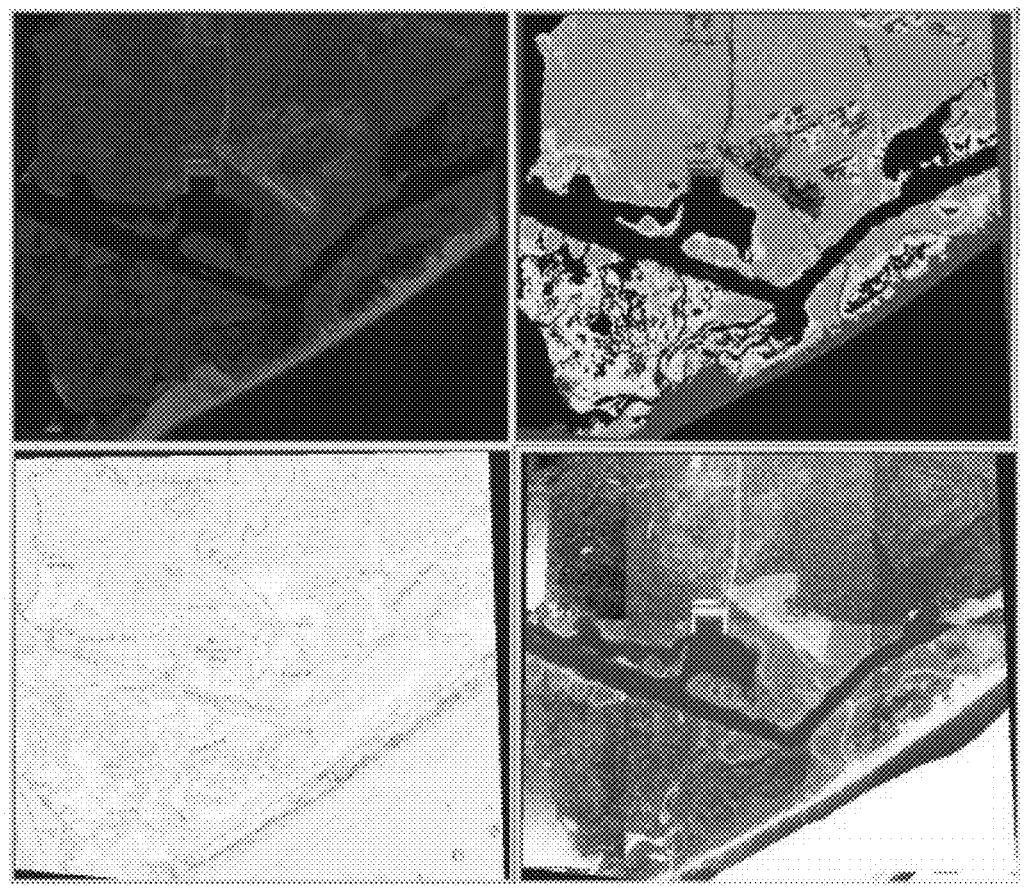
FIG. 13 is an image showing a four-color figure ground structure generated from Ikonos MSI imagery for the runway ROI at Camp Lejeune, N.C.
Figure 14A:
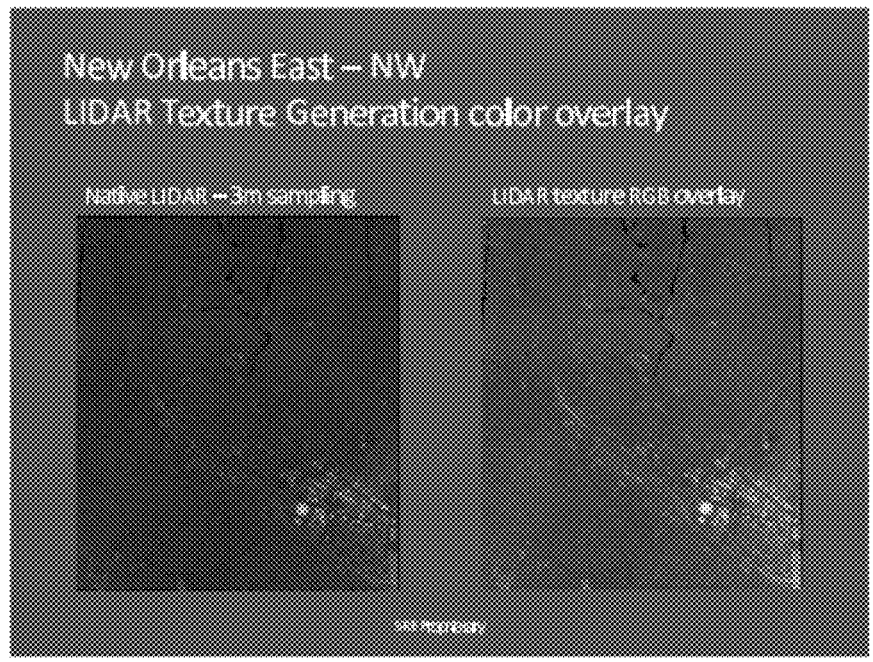
FIG. 14a is an image showing LIDAR data in an image format.
Figure 14B:
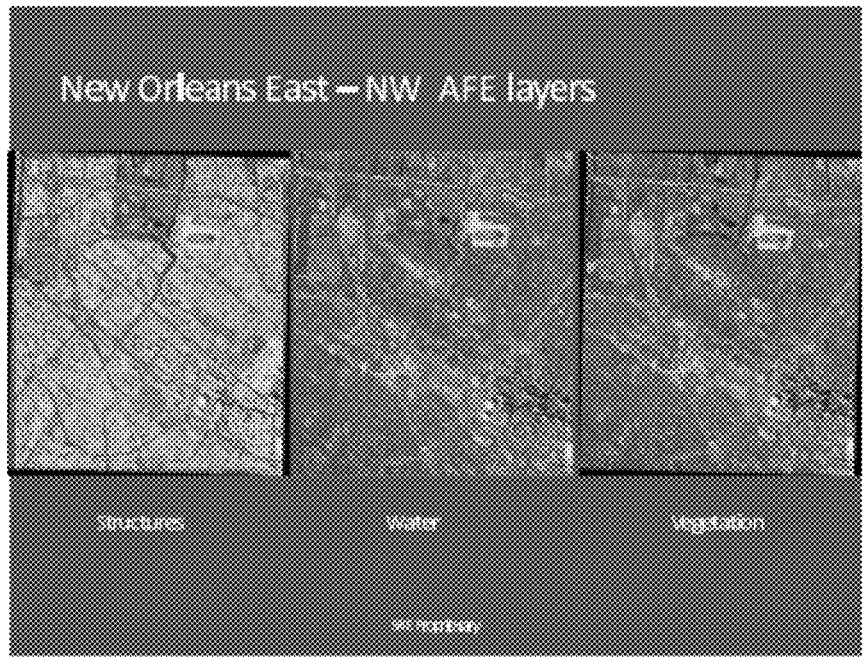
FIG. 14b is an image showing a LIDAR elevation based structure, water and vegetation.
Figure 14C:
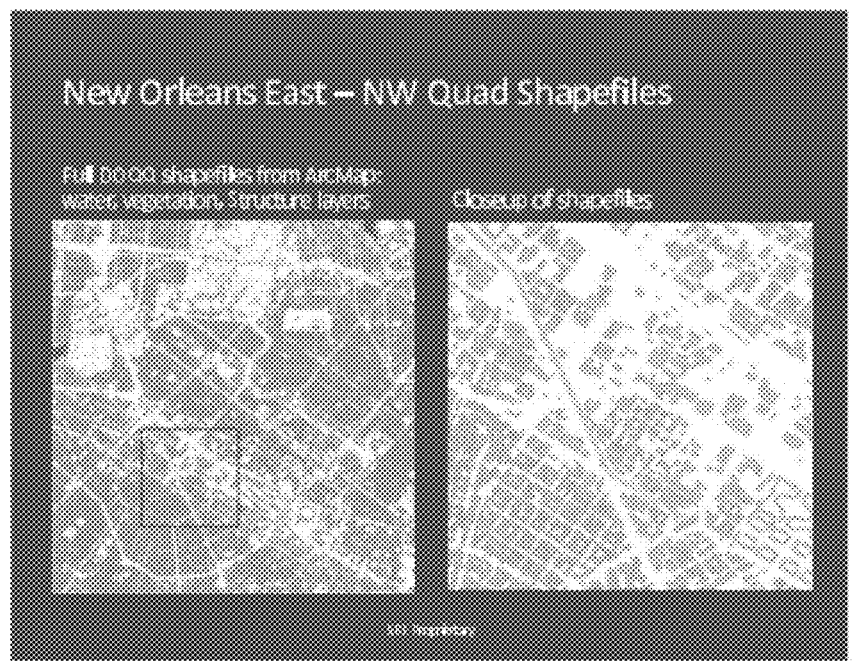
FIG. 14c is an image showing a close-up of structure layer.
Figure 14D:
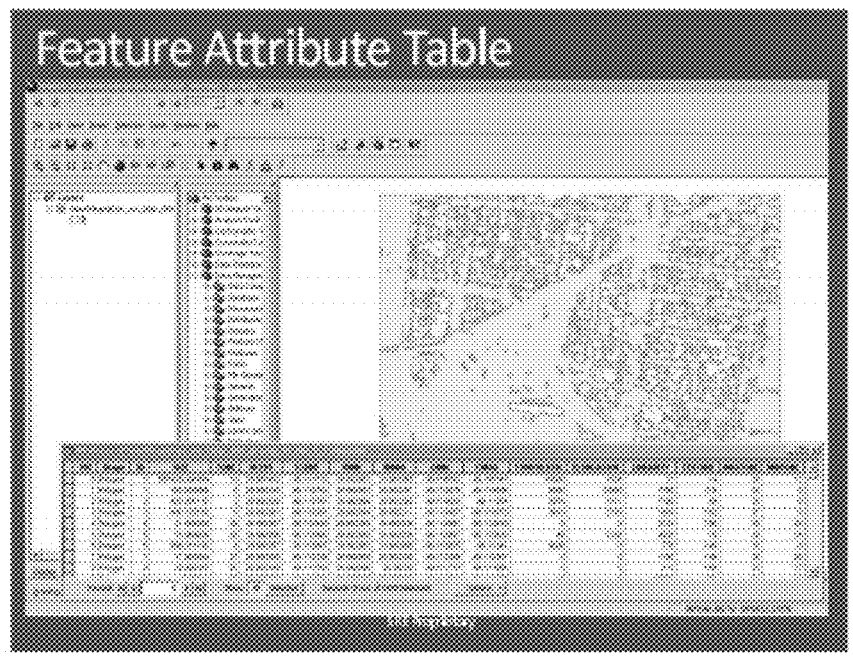
FIG. 14d is an image that depicts a shape file and GIS database representation of structures.

FIG. 13 demonstrates the same capability to transform a conventional RGB composite MSI imagery into a user-specified four-color coded imagery for a more effective visualization of the scene contents in the paradigm of figure-ground and simultaneous contrast perception.

For a more comprehensive comparison between the present invention dominant feature signatures derived color representation of the input imagery against other forms of representation of the same, the original Ikonos MSI (NW Quad), corresponding Topo Map (SW Quad) and airborne Color IR image (SE Quad) are compared against the present invention four-color figure ground system (NE Quad) representation. Particularly the runway stands out against two "ground" sets: (1) black zero-value pixels and (2) nearly green vegetation.

FIG. 14 demonstrates imagery/data fusion to integrate dissimilar data sources into a spatially cohesive information representation to achieve a synergistic understanding of the scene contents. The present example exploits the synergy between capability of conventional RGB airborne imagery and high-resolution LIDAR terrain/object elevation data. As a special case fusion with geospatially registered imagery, the input data are geospatially cohesive since the ROI mask covers the same geospatial space with dissimilar data sources. Since it is difficult to extract structures from MSI imagery, it is ideal for using LIDAR data to complement the capability of a conventional MSI sensor. Similarly, if confusion exists between trees and structures in the LIDAR domain, the MSI data can be used to reject the elevation pixels that are considered by LADAR as building structures. (See FIGS. 14a to 14d.)

Video imagery comprises a stream of time-sliced sequential frames. In general, adjacent video frames are not geospatially registered. When the video camera is stationary, the frame displacement is relatively small. However, even when the video camera moves, usually some scene-content overlaps between adjacent frames. The inventive system for analyzing video imagery is ideal for multi-source data fusion for situation understanding, object extraction, ROI linking and Event detection since:

a) the coverage of multi-source data generally overlaps, but is not geospatially registered;

b) the temporal domain of multi-source data is generally known;

c) an ROI mask can be transferred to non-spatial data sources after the information is geospatially referenced; and d) automated "scene registration" run is ported by an object linker, instead of physically registered or geo-registered with common GCP.

The above characteristics of multi-source data permit the current inventive system to analyze multi-source data as if they were video frames. This means that the examples given in FIGS. 2 through 11 on ROI extraction, ROI linking and Event detection are applicable to multi-source data fusion.

Once multi-source images and image representation of data are formatted as if they were video frames, object recognition is performed by the linker demonstrated in FIGS. 2 through 11. Therefore, the invention performs a generalized, automated scene registration without having to rely on the identification of the ground control points that are geospatially common and consistent among the input data sources. This is a significant breakthrough in remote sensing science and technology.

Earlier, the Equation (2) was used to conceptualize the relationship between a scene and a feature signature library representing its contents with Human language key words:

$$\text{Scene-Library-Master-Time-002-Labeled-5-Other-7-Unknown-x} \quad (2)$$

While Equation (2) is an elegant symbolic representation of a scene, it is even more advantageous that the corresponding information capture and visualization environment be implemented for real-world applications. The following sections demonstrate such a system implementation of the Equation (2).

Figure 15A:
FIG. 15a is an image showing a feature-signature system module #1: display GUI.

The first system module is a GUI (graphic user interface) system which loads in the needed imagery, and displays it for interactive feature signature extraction and library building. (FIG. 15a uses the same data set as FIG. 13.)

Note that this scene is identical to that shown above (NW Quad of FIG. 13).

The second system of the invention is a GUI-based signature extractor using an ROI mask supplied by the user. The module automatically extracts a user-specified number of feature signatures as shown in FIG. 15b.

Figure 15B:
FIG. 15b is an image showing system module #2: feature signatures extractor.

FIG. 15b shows that Module #2 allows the user to use an ROI mask shown at the NW corner for signature extraction. In addition, the insert window (Right Upper Corner) shows the 10 signature locations automatically selected, labeled "bright-sand." The right panel shows the name of the signature group labeled by the user. The (10) after signature name, bright-sand, indicates that the group signature contains 10 elements.

The third module of the current system implementation is a GUI system which permits real-time mapping of a quantitative measure of how well an observed pixel is matched against a feature signature/group/system. For demonstration purposes, a pixel was selected from a similar region as "bright-sand" and called "test-p1." The test-p1 was also designated as a feature signature so that any other pixels could be matched to both the test-p1 signature and bright-sand signatures, as shown in FIG. 15c.

Figure 15C:
FIG. 15c is an image showing system module #3: real time pixel-to-signature mapper.

FIG. 15c shows that the degree of match between test-p1 pixel (yellow location) and test-p1 signature is 98%, whereas, the matching level between test-p1 pixel and bright-sand group signature is 88%. Sub-signatures of the group bright-sand signature are listed below the group signature with a suffix of -1 through -9. (The last element, 10, is truncated and not shown.)

Figure 15D:
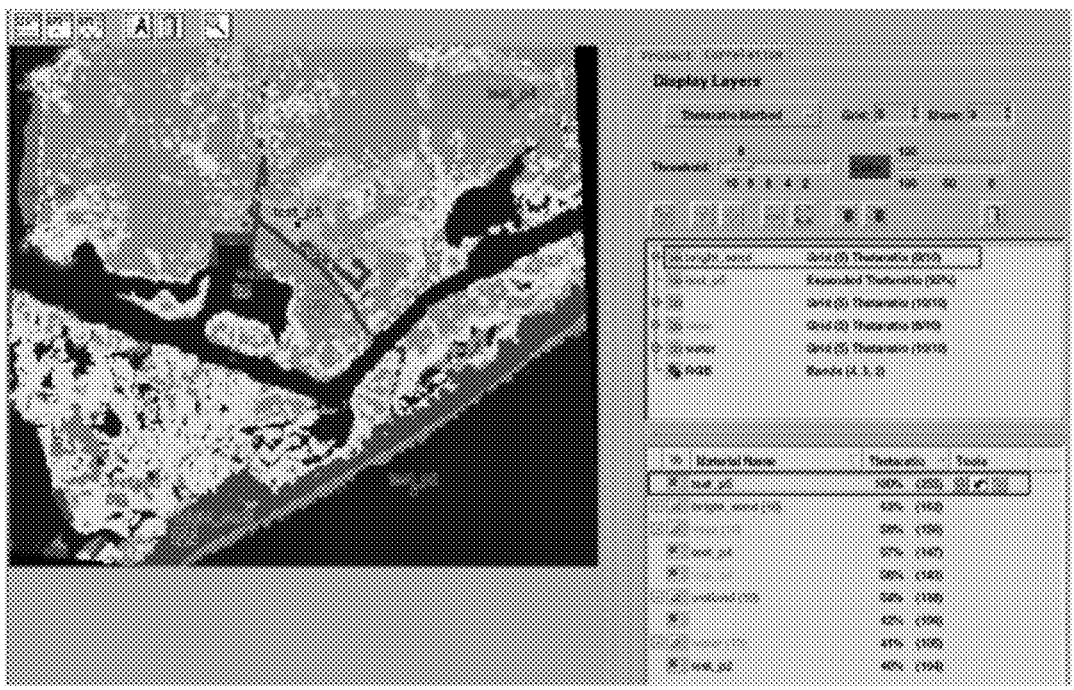
FIG. 15d is an image showing system module #5: implementation of the proposed multi-faceted feature ground structures/mosaic system.

FIG. 15d is a system implementation of Equation (2) shown below:

$$\text{Scene-Library-Master-Time-002-Labeled-5-Other-7-Unknown-x} \quad (2)$$

For example, the key word "Scene" is the FIGS. 15-1 scene. A subset of key word "Library" is "bright-sand(10). "Label" is bright-sand and test-1. The dual representation of the scene by the Library is: (1) feature signatures and (2) feature scene with quantitative representation of pixels being the entirety of FIG. 15d. This demonstrates that the key words are quantifiable and implementable.

As discussed earlier, multiple feature signatures generate a multi-tone mosaic of figure ground structures for an effective visualization of ROI for object recognition. System implementation of this novel paradigm is shown in FIG. 15d using a five-color system to simulate the feature-signature decision map in the paradigm of figure-ground and simultaneous contrast perception By adding four more signatures in addition to "brand-sand," there a 5-color feature decision map of FIG. 15d comprising:

a) bright-sand by red color, the first feature signature;

b) water by blue color;

d) wetland by yellow color;

d) vegetation by green color; and e) test-p5 by orange color, the last added signature to represent "other."

The four-color visualization system (items "a" to "d") above clearly reflect the ROIs from FIG. 13. This demonstrates that the present invention has succeeded in the implementation of Equation (2) by a set of GUI based system integration modules.

In Equation (2), feature signatures belong to "other" and "unknown" categories. To implement a means to generate an "other" signature, one feature-signature extraction pixel is added at a location not covered by any of the colored group. This particular pixel is "test-p5" located at the NW corner of and above the Runway. Since "test-p5" is also a feature signature, the pixels that are extracted are highly associated with the "test-p5" feature signature, displayed by the Orange color coded region (item "e" above). This region is essentially the background of the Runway. It was an "other" category because it was spatially not covered by the four prior labeled signatures: bright-sand, water, wetland and vegetation. Currently, the signature is called "test-p5." To label it, it can be called "open-area."

It has been noted that the "unknowns" are made of the "residuals" after the pixels had been mapped into "labeled" and "others" categories. Therefore, the "empty areas" in FIG. 15d are occupied by the "residual" pixels for mapping into "unknowns."

Figure 15E:
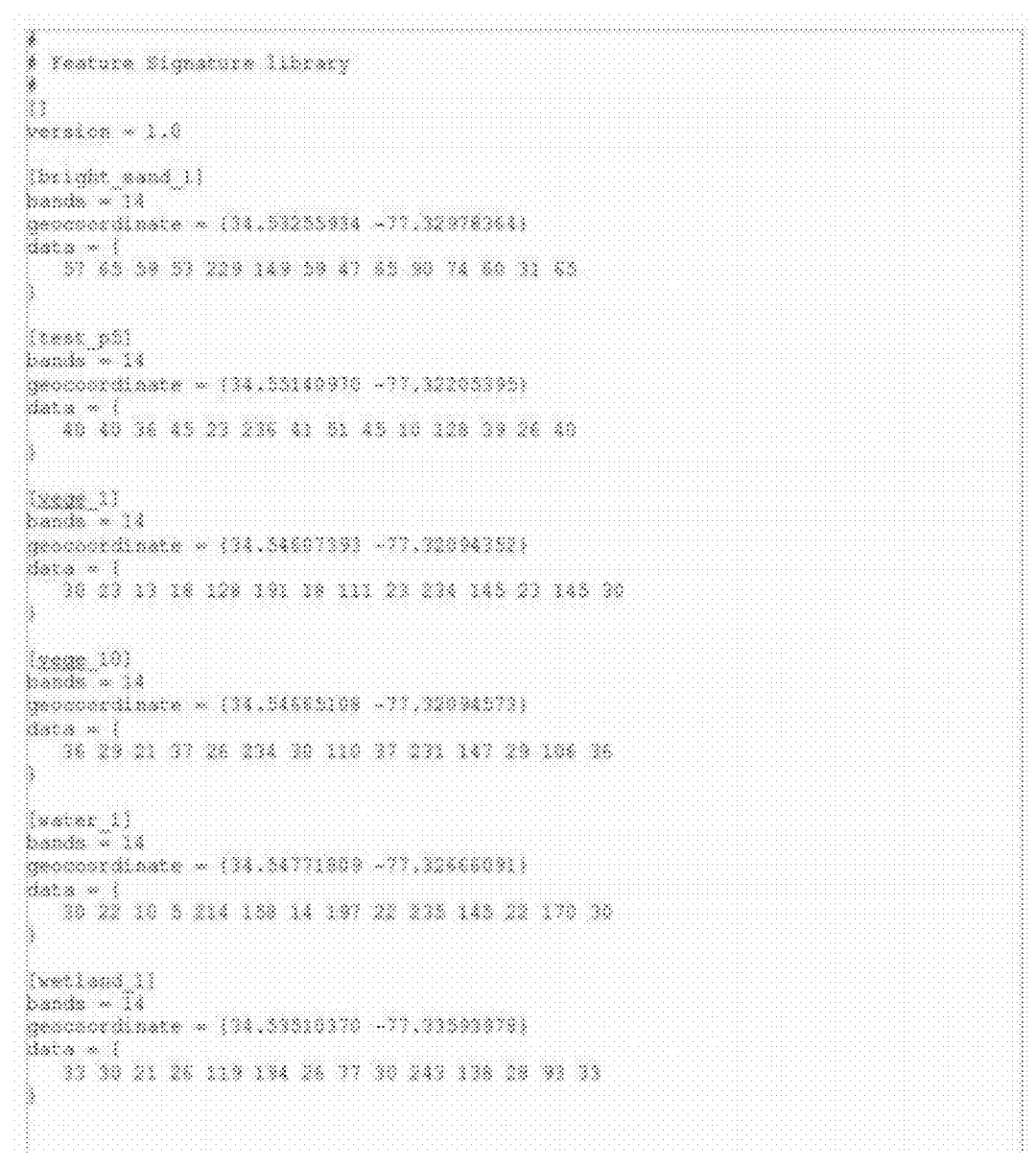

The last item of Equation (2) to be implemented is "Library", which represents the scene content. It was previously noted that a library comprises a set of elements, each being a "feature signature." It was also noted that the right-hand panel of FIG. 15d contains the names of a subset of a feature signature library. Mathematically speaking, a feature signature is represented by a set of integer numbers, and a feature signature library is made of a set of feature names, each comprising a set of integers. FIG. 15e is a subset of a real-world feature signature library.

Note that last item of the library is wetland-1 signature represented by a set of integers: [33 30 21 25 119 194 26 77 30 243 138 28 93 33].

Thus, the five components constitute a real-world, real-time Terrain Categorization and Situation Awareness system, conceptualized and system implemented with a set of human language based quantifiable key words.

Figure 16A:
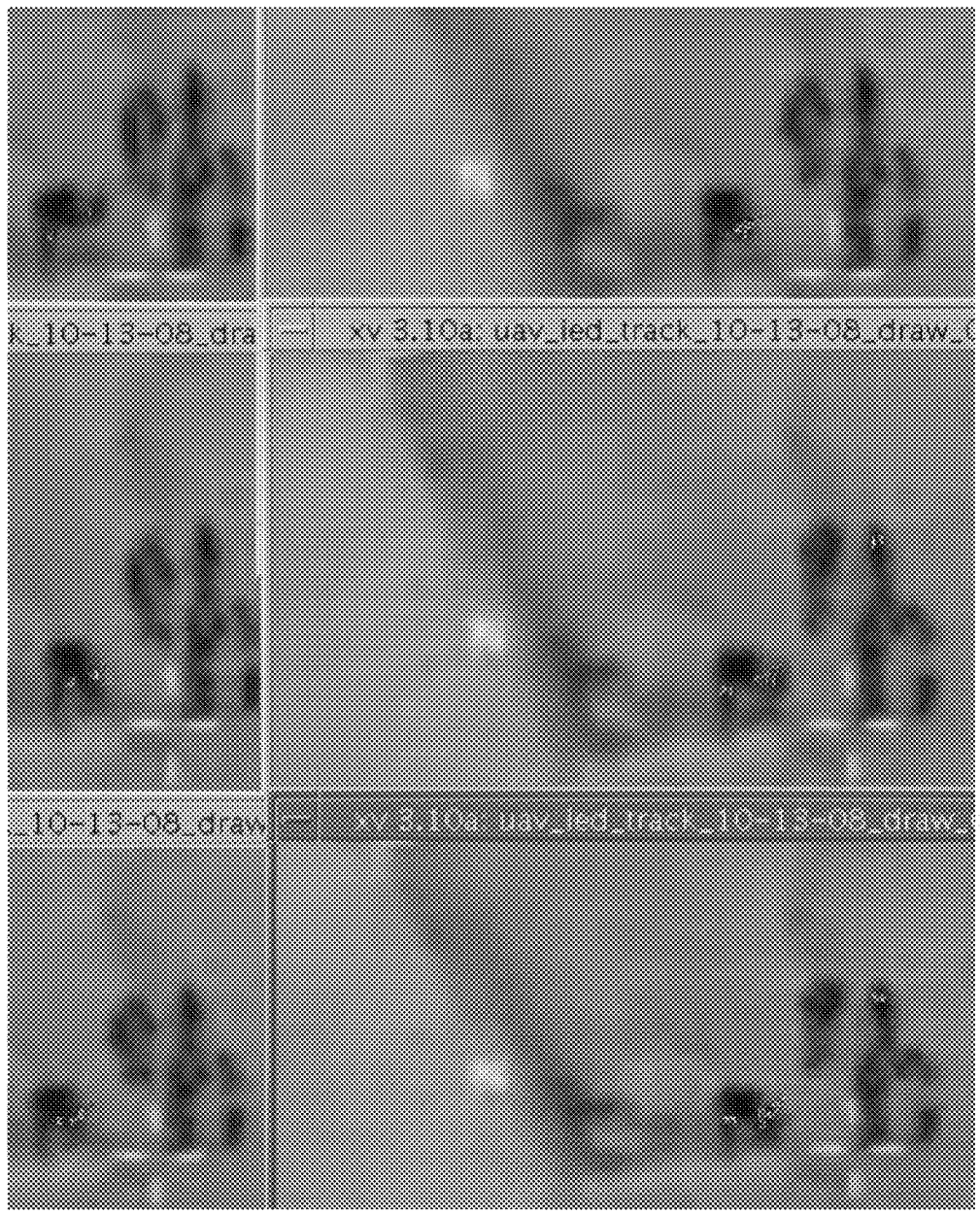
FIG. 16a is an image showing a series of time-varying linked ROI imagery.

Previous studies in early 1990s attempted to extract ground vehicles by using a paradigm originally designed for air vehicles. The current invention makes it possible for the user to integrate data from both a moving and a non-moving object sensor without using the paradigm of air vehicle tracking, which requires the use of a set of state equations/Kalman filter. The invention of object linking is based on ROI descriptors in the context of global linking, not single, independent one air or ground vehicle at a time. FIG. 16 demonstrates ROI-linking of the movement of a "shovel" from a set of UAV-acquired imagery.

Six ROIs are linked and labeled. The left top image #1 shows numerals 1 and 2 for linked object #1 (leg) and #2 (arm).

The third frame shows movement. The blue loop of blue line in the right side second frame links an up-and-down arm movement. The corresponding magnified frame is shown in FIG. 16b.

Figure 16B:
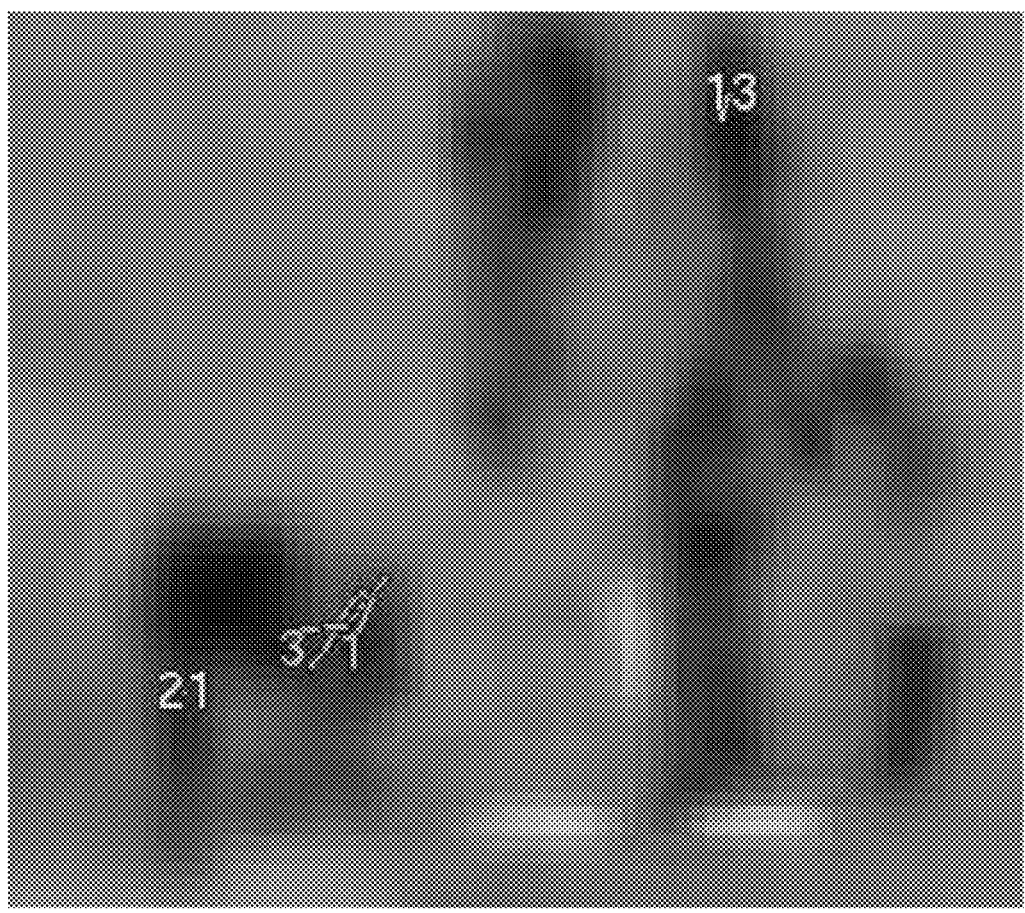
FIG. 16b is an image showing an enlarged scene of second right frame.
Figure 16C:
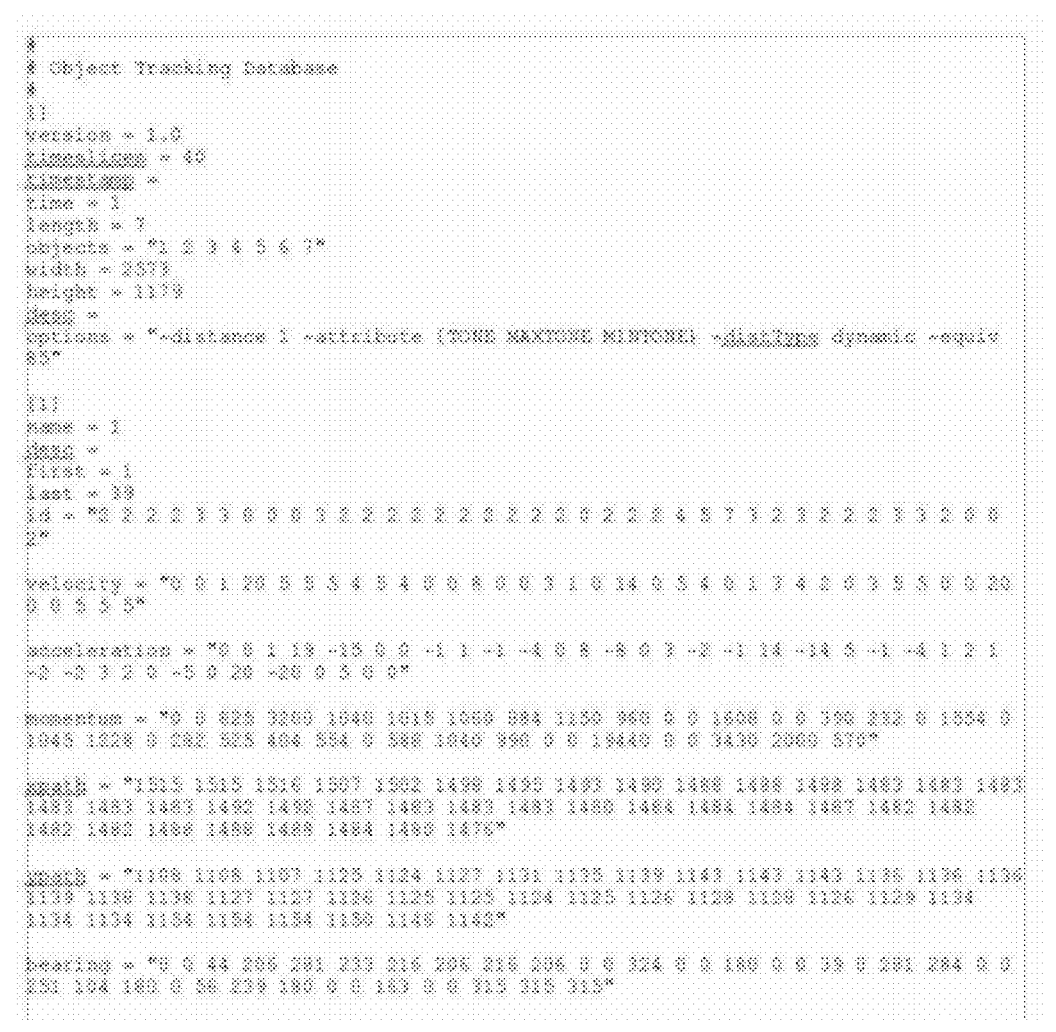

The blue link line in FIG. 16b has linked an arm movement of SW-toward-NE-down-SW. An Event Detection rule can be developed from this motion link set. FIG. 16c shows the corresponding link file to verify the description of the arm movements over time.

The above database constitutes the object motion data of ROI [1] with:
  a) linked object ID over 40 time series;
  b) velocity data;
  c) acceleration data;
  d) momentum data;
  e) xpath data;
  f) ypath data; and
  g) bearing data.

To describe digging, the bearing data can be used, where [0] is the 12 o'clock, North direction, [90] is East, [180] is South, [270] is West, and [360] is also North. For an up-and-down motion, [0 to 60] can be used as up, and [180 to 270] as down. Accordingly, the bearing data series can be generalized as:
  [up-up-up-down-down-down-down-down-down-down-up-up-(up)-up-up-up-up-down-down-up-up-down-(up)-down-up-up-down-down-up-up-down-up-up-(down)-(down)-(down)] or generalized as:
  [up-down-up-down-up-down-up-down-up-down], which repeat 5 "up-and-down" motions.

Thus, an event-based Automatic Target Recognition (E-ATR) rule set can be constructed using the generalized up-and-down motion series in conjunction with other motion data like velocity, acceleration and momentum.

Figure 17A:
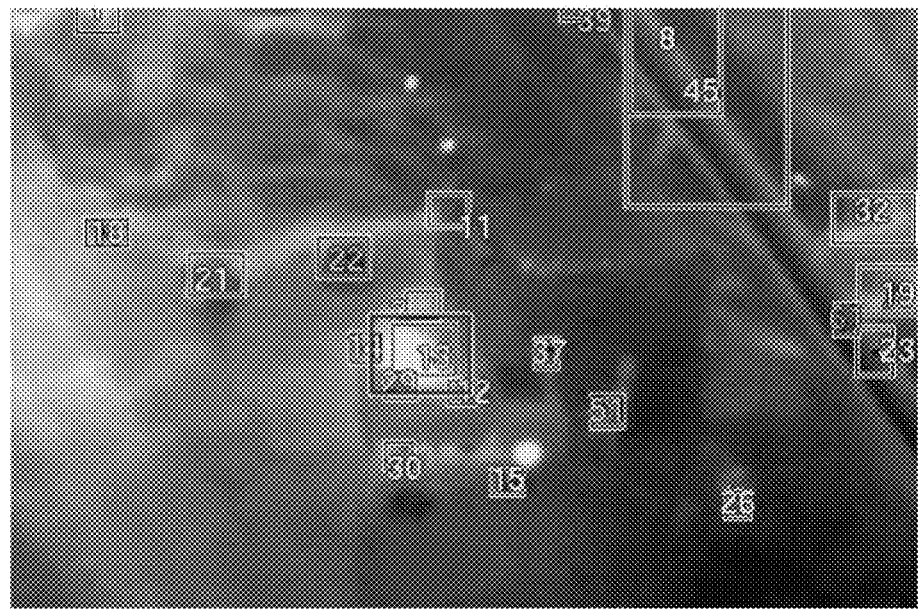
FIG. 17a is an image showing simultaneous firing-gun and moving people.

The second example of E-ATR demonstration based on simultaneous "gun firing" and "people motion" is shown in FIG. 17a. A complex object (a firing gun) is shown with multiple plume-based objects, and the beginning of moving people is denoted as ROI-51 in blue numerals.

Figure 17B:
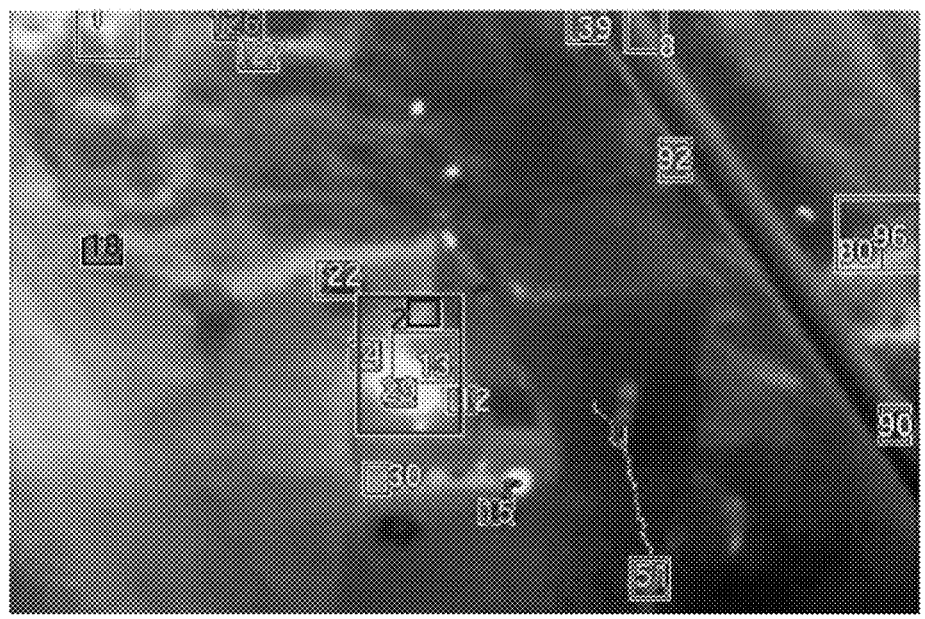
FIG. 17b is an image showing simultaneous linking firing-gun and moving-people trail.

In FIG. 17b, the complex object (a firing gun) is shown and the trail (blue) indicates moving people.

The utility and concept of using synergistic approaches to combine classic ATR methodology of detecting a hot object as a target, and use linking to identify both the plume components and the people component of a target complex are demonstrated by the event based ATR invention.

Earlier it was noted that the ground control points from different sensors or different acquisitions of the same sensor rarely agree. The present invention unifies two slightly mismatched coordinate systems dynamically using either one ground control point or multiple GCPs by first testing the goodness-of-fit between a camera model and the reality, and second, fixing the mismatch for real-time field applications.

For example, two parties must match geo-referenced image of the same ground coverage. The invention designates one party to be the "Center of An Equi-distance Projection" and the second party adjusts the geo-coordinate reading of the Ground Control Point according to the geo-coordinates provided by the first party. Once the second party receives the geo-coordinates of a particular ground control point (feature), s/he adjusts or corrects it. After that, the inventive system creates a new coordinate system to adapt to the designated "Center."

In addition to the latitude-longitude geo-spatial system, the inventive system generates two forms of map projections: (1) Virtual Transverse Mercator Projection (VTM) system as described in U.S. Pat. No. 7,343,051 awarded to Hsu, and (2) the original Universal Transverse Mercator Projection (UTM). If needed, one can add a virtual Equi-distance system with a user-specified ground control point as its "Projection" Center.

Since U.S. Pat. No. 7,343,051 is already implemented for real-time applications, a modification of it for one-GCP application is an adaptation with fewer assumptions For example, both parties' image orientation is the same.

The second form of implementation constructs an equi-distance system in real time using any given ground location. While it is theoretically possible to generate an equi-distance projection from a given point, the challenge lies in adapting the "Projection Center" using dynamic ground control points, not one fixed Projection Center. The current application reflects a solution by generating a geogrid using a user-specified location, such as one of the GCPs, as the equi-distance system center, yielding a geogridded Virtual Universal Transverse Mercator Equi-distance System (VTM-ES), for which the UTM is a special case.

While the vast majority of imaging systems for geospatial awareness are not orthographic projection based, few conventional software applications implement a projection to handle skewed images. They typically use resampling to warp one image to fit the other. The current invention implements such a means to improve the capability of the VTM system (U.S. Pat. No. 7,343,051), and to complement the one-GCP system discussed above.

The properties of skewed images have been known for more than 100 years. In its simplest case, when a photogrammetric camera is aimed downwardly (depression angle of 90 degrees), the image is a result of a projection. When the camera is aimed with a depression angle of 80 degrees, however, it generates an oblique image. The difference between a depression angle of 90 degrees versus 80 degrees makes a drastic difference in how a solution is implemented.

For real time field applications like geospatial awareness, one never knows the relation between two images of the same aerial coverage. For example, one image may be very close to orthographic like a map, and another image may be an oblique one. Another scenario is for one image to be satellite imagery, while another is an airborne one. Thus, the unknown imaging conditions make it extremely difficult for a software system with a fixed number of image registration options to handle. What is needed is a generic, dynamic GCP/image matching system that can adapt to a wide variety of geospatial awareness conditions, such as (1) having enough time to enter only one GCP, (2) having enough time for entering more than 5 GCPs, (3) having near orthographic image versus oblique images. The current invention graphically represented by FIG. 18 solves such a time-critical, and highly unpredictable GCP/image matching problem with the following properties:

1) allowing the user to enter only one GCP, 2) allowing the user to enter two or more GCPs as time permits;

3) allowing the user to register perspective projection based images;

4) allowing the user to perform real-time Virtual Transverse Mercator Projection for image registration/georegistration;

5) allowing the user to visualize the relative quality of GCPs, 6) allowing the user to visualize the goodness-of-fit between a camera model and reality to generate an optimal solution;

7) allowing the user to modify GCP with visualization of the relative quality of the individual GCP;

8) allowing interactive and automated modification and selection of GCP to achieve an optimal statistical match between the base and the aligned scene/image cube;

9) allowing the output image to keep the original pixels' digital number (DN) values after GCP/image matching; and 10) allowing the user to output a geogridded equi-distance coordinate system, based on the user-specified projection center, such as one of the GCP, yielding a geogridded Virtual Universal Transverse Mercator Equi-Distance system (VTM-ES).

FIG. 18 comprises two graphs: the left is a dynamic model selection guide, and the right is a symbolic representation of the relationship between the number of GCPs used and the corresponding solution models. Particularly, referring to the left column, if one GCP is used, the solution model is suboptimal. If the number of controls is increased to three, the dynamic system shifts to a statistical goodness-of-fit solution. Since GCP selection and modification takes time, the current invention offers the user a choice to achieve either an optimal or a sub-optimal solution as a function of time.

Figure 18A:
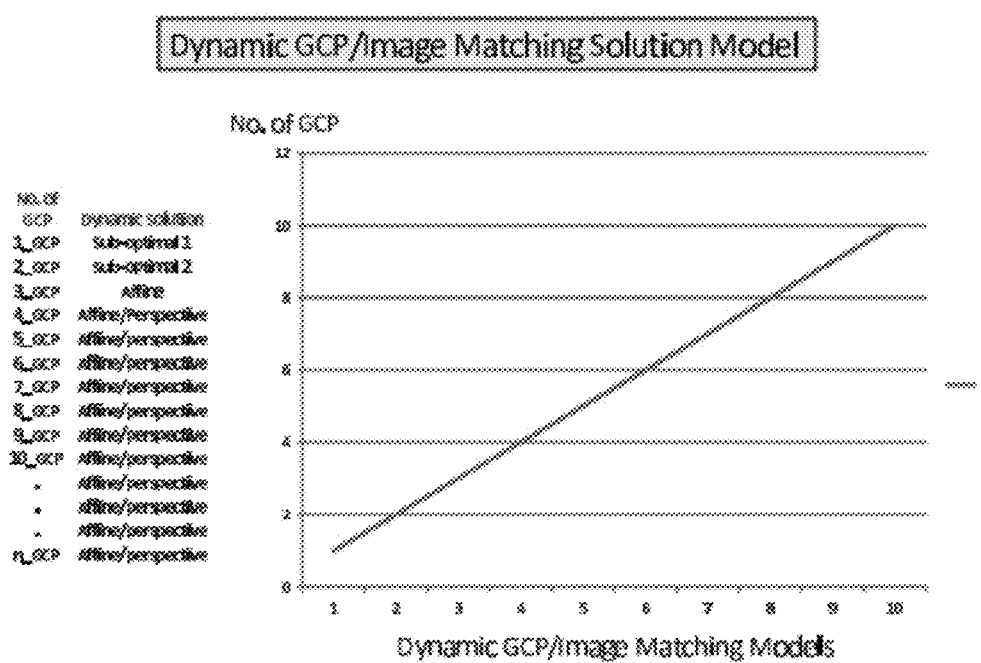
FIG. 18a is a graph showing dynamic GCP/image matching model invention system.
Figure 18B:
FIG. 18b is an image showing a geogridded VTM based equi-distance projection.
Figures 18C, 18D:
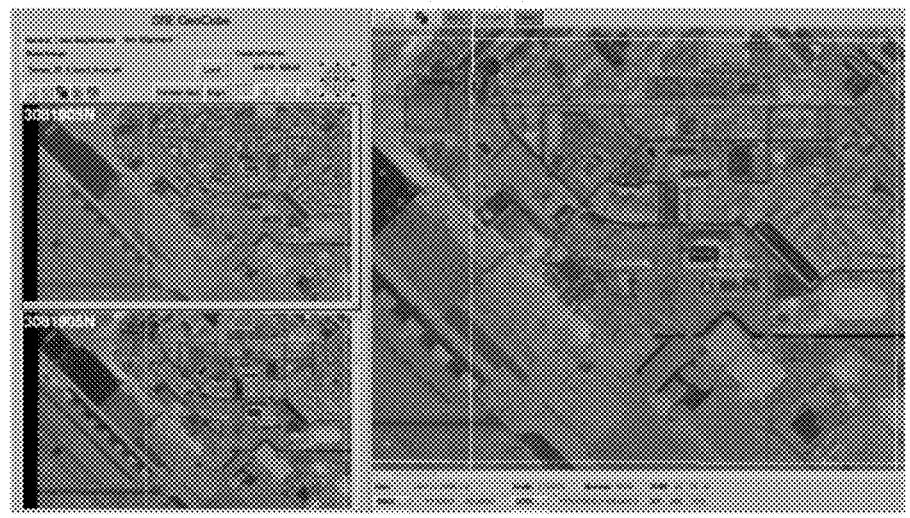
FIG. 18c is an image showing a close up of a sample geogrid.
FIG. 18d is a table showing model-mismatch data by pixels.

Quality of match is usually determined by a measure on how well a given model fits the data. A curve fitting problem using linear, or curvilinear or higher order polynomials is an example. A goodness-of-fit in this case is a measure of the deviation between the data points and the fitted curve, the smaller the deviation, the better the model. In photogrammetry, the analogy to "deviation" is known as "root mean squares" or RMS. For the current invention, the goodness-of-fit measure is in terms of a distance measured by the number of pixels deviating from the model. Such a pixel-based goodness-of-fit measure is much more intuitive than other indirect parameters. FIG. 18b shows a geogrid based on a VTM projection centered on a user-specified Central Meridian. Since the interval between grid lines is equi-distance, FIG. 18b is equivalent to a VTM Equi-Distance projection centered on the local central meridian (leftmost grid line). FIG. 18c is a sample geogrid for two time periods. Each of the above numbers in FIG. 18b in yellow is a distance measure from a local geogrid line. FIG. 18c is a close-up of such as geogrid system.

The left column of FIG. 18c has two sub-images: the upper image is a 1000 m grid of 2005 QuickBird; the lower image is a 1000 m geogrid of 2006 QuickBird imagery of Tampa, Fla. The right portion of FIG. 18c is a composite image from two left-column geogrid images. The white grid line on the left is the local central meridian of a Virtual Universal Transverse Mercator Projection.

The geogrid in FIGS. 18b and 18c is based on a square grid. For a more realistic equi-distance projection environment, the grid lines should be concentric circles, as shown in FIG. 18d.

Figure 18E:
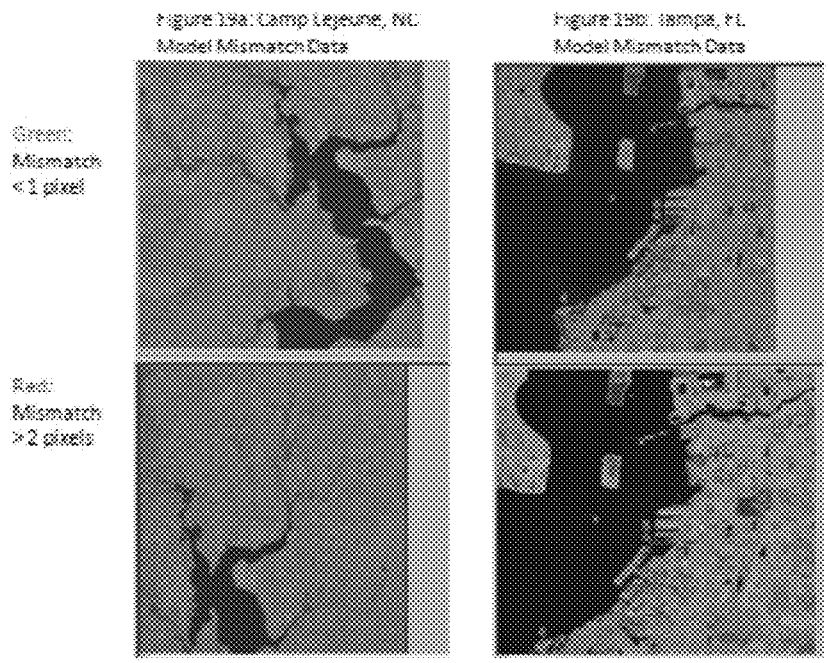
FIG. 18e is an image showing GCP locations in Tampa and Camp Lejeune scenes.

The current invention provides a means by which additional GCPs are entered automatically and the magnitude of the mismatch is minimized. The corresponding GCP locations are shown in FIG. 18e.

In the above sections, it has been demonstrated with real world case studies that object extraction and event detection can be achieved with still and video imagery interchangeably when it is appropriate for achieving a specific task. Be it still or video imagery, the overarching object/feature exaction, and event/activity detection approach lies in the system implementation for exploiting a figure ground structure that has been propagated over the entire scene space to form a multi-tone figure ground structure mosaic. In addition, the paradigm for analyzing video imagery is readily adaptable to real-time terrain categorization/situation awareness, and multi-source data fusion.

As discussed and demonstrated earlier, the elementary building block of such a multi-tone figure ground structure is an image structure designated as a "mask." A simplest mask is composed of a two-DN-value image and a set of corresponding imagery set. A more complex mask comprises a multi-DN-values-coded imagery and corresponding imagery set, or multiple masks.

The second elementary system building block is a feature signature library generated automatically from input imagery. Specifically, it is defined and demonstrated that a feature signature library is a dual representation of an object or a feature by a feature signature and its corresponding feature raster image. Thus, a scene is represented by the duality of its feature signature library.

As discussed and demonstrated with a real world example, for a perceptually effective image exploitation, it is desirable to integrate such a feature signature library representation of an input imagery with the perceptual theory of figure ground structure. In other words, the pixel value in the multi-tone figure ground mosaic imagery possesses a quantifiable measure that can be traced back to how it is associated with each of the feature signatures of the input imagery.

The third system building block is a rule set library for extracting and linking pixels of interest (POI) and ROI. The combination of the rule set library and the figure ground structure representation of the feature signature library and feature scenes plus the corresponding ROI mask set is POI/ROI extraction and Event/Activity detection. Thus, the border between still imagery and video imagery for POI/ROI extraction is diminished.

The fourth system building block is the robustness and adaptable characteristics of the feature signature library, specifically in the context of using video imagery for ROI extraction and Event/Activity detection. Specifically, for each feature signature, it is possible to have three kinds of automated, or interactively interchangeable subsets: labeled, others, and unknown.

The fifth system building block is the ROI linker, which uses database data and image data to correlate similar ROI over space and over time. While the linker system is built for Event and Activity detection with video imagery, it is readily adaptable to multi-source data fusion. With this inventive paradigm, multi-source data fusion without a priori registration or georegistration is realized, representing a significant breakthrough in remote sensing science.

The sixth system building block is a dynamic GCP/image matching system for field-based situation awareness applications shown in FIG. 18. The system allows the user to enter and modify any number of GCPs as a function of GCP selection and modification time. The inventive system always delivers either an optimal or sub-optimal solution as a function of the number of GCPs and the quality thereof, quantifiable and visualizable in a Virtual Universal Transverse Mercator Equi-Distance system environment.

Figure 19A:
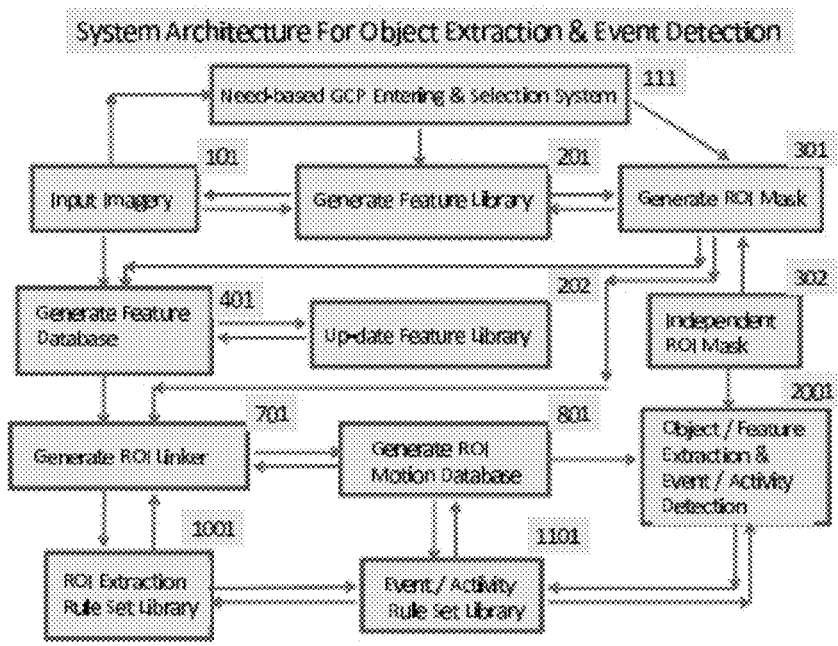
FIG. 19a is a flow chart showing system architecture of the invention.
Figure 19B:
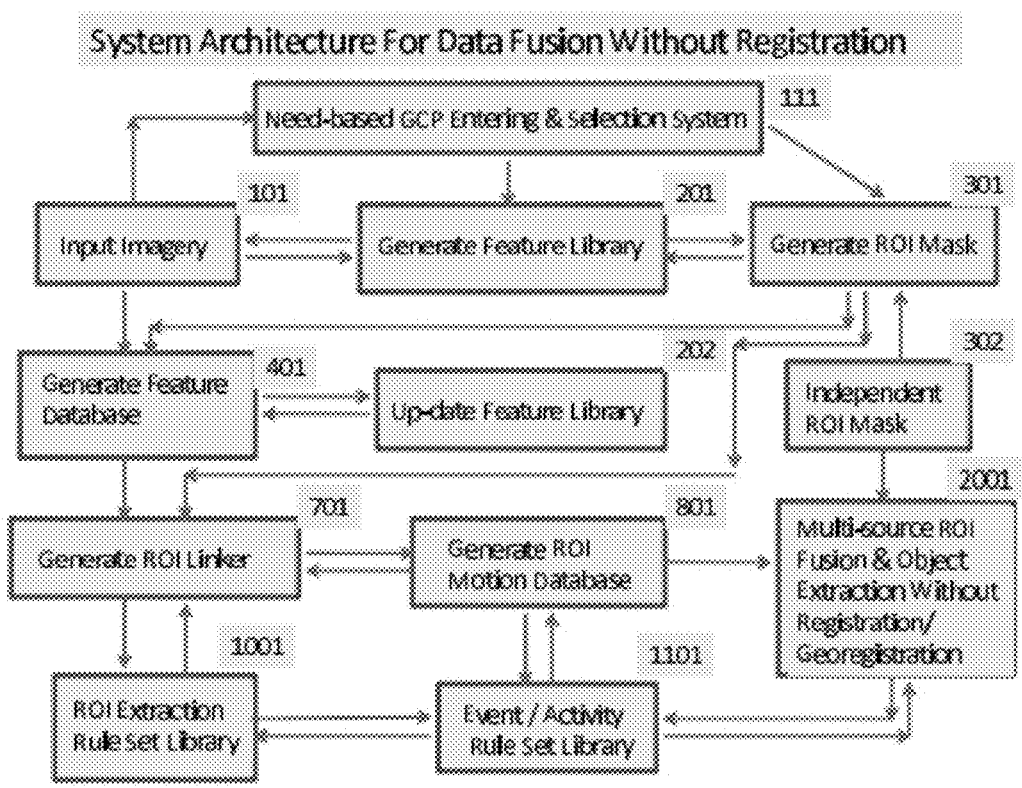
FIG. 19b is a flow chart showing system architecture for data fusion without registration.

Having discussed the fundamental characteristics of system modules, the present the system architecture is graphically, shown in FIG. 19a. An application of this overarching system architecture for multi-source data fusion is depicted in FIG. 19b.

In FIG. 19a, module 101 ingests input imagery and data. Its format can be multi-sources including, but not limited to, still images like SAR, or a single band image, or MSI, or time-varying video images, or an irregular matrix of LIDAR data, or signal data represented by geospatial locations.

Module 111 provides a dynamic system for the user to select the number of ground control points on a need base to match GCPs and images, and visualize the quality of the entered GCPs individually and incrementally in a Virtual Universal Transverse Mercator Equi-Distance system environment.

Module 201 generates a corresponding feature signature library from the ingested input imagery/data. Each feature signature is a dual representation—signature vector plus its associated feature scene—of a dominant feature of the input imagery/data.

Module 301 generates or accepts an ROI mask, which has a dual representation of the physical mask and its corresponding input imagery/data.

Module 401 generates a set of feature attribute tables to constitute a scene content database based on the ROI masks and the feature signature library.

Module 202 is the updated feature signature library from both internal and external sources.

Module 302 is a mask from independent sources.

Module 701 is the ROI linker for multi-temporal, multi-source imagery/data fusion application. Video imagery is a class of multi-temporal imagery/data. The ROI linker paradigm is adaptable to multi-source data fusion without a priori registration or georegistration.

Module 801 generates motion related ROI feature attributes from the link file as illustrated in FIGS. 7, 8 and 9. Modules 801 and 401 form a scene content database from both static and dynamic ROIs and the updated feature signature library.

Module 1001 is a Rule Set Library for still imagery/data applications.

Module 1101 is a Rule Set Library for video imagery/data applications.

Module 2001 is the extracted ROI and Event/Activity Detection Results that can be used as feedback to the Rule Set Library for modifying and updating the rules therein.

The system architecture for multi-source data fusion without registration/georegistration, shown in FIG. 15b, under the same paradigm shown in FIG. 15.

Finally, all system modules interact with each other and among themselves. Obvious interaction between two modules is shown by two-directional information flow arrows.

Thus, it can be seen that the methodology of the invention can be adapted to process other physical phenomenon, in addition to images, such as stock markets, multi-media, textures, fragrance, and flavors. Merely by providing appropriate physical phenomenon models and descriptors to the system, the invention method can be used to analyze and extract portions of such physical phenomena.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A system for linking an object for situation awareness in a data fusion domain representing a space comprising a plurality of data sources, comprising:
   a) a feature signature library comprising at least one feature signature to convert pixels in a raw image into a feature scene in which each pixel is associated with said feature signature by a quantifiable measure from at least one data source by applying at least a first data analysis method thereto;
   b) a region of interest (ROI) spatial mask in which pixels in a raw image are represented by a feature signature library from at least one data source by applying at least a second data analysis method thereto;
   c) a rule set library comprising at least one rule to allow ROIs in a raw image to link each other, and among themselves using at least one ROI descriptor from at least one data source;
   d) at least two data sources fused by applying at least one data fusion analysis method; and
   e) means for generating and outputting an ROI tracking result from the fused data using at least one database format.

2. The system for linking an object in accordance with claim 1, wherein said pixels in a raw image comprise at least one from the groups:
   i) still multi-sensor imagery;
   ii) video imagery;
   iii) non-image data;
   iv) an ROI mask;
   v) an independent feature signature library;
   vi) an independent rule set library; and
   vii) an independent database.

3. The system of linking an object in accordance with claim 2, wherein raw images are georeferenced.

4. The system for linking an object in accordance with claim 1, wherein said at least one data fusion analysis method is at least one chosen from the group:
   i) manually selecting a pixel to represent a group of relatively uniform pixels;
   ii) providing an existing feature signature library;
   iii) automatically extracting a set of feature signatures, the number thereof being specified by the user;
   iv) automatically extracting a set of feature signatures in which at least one of said feature signatures is predetermined;
   v) automatically extracting a set of feature signatures in which at least one thereof has an attribute chosen from the group: labeled, other, and unknowns;
   vi) fusing data in an image analysis domain;
   vii) fusing data in a feature attribute database domain;
   viii) fusing data in a combined image and database domain;
   ix) fusing data in an exact georeferenced domain;
   x) fusing data in a loosely-defined georeference domain;
   xi) fusing data in an ROI-linker domain;
   xii) fusing data in an ROI-mask domain; and
   xiii) fusing data in an ROI-mask domain with a feature signature domain.

5. The system for linking an object in accordance with claim 1, wherein said ROI spatial mask is chosen from the group:
   i) an independent source;
   ii) a geospatial mask in which each pixel location has latitude and longitude data associated therewith;
   iii) a mask automatically generated from a feature signature in said feature library;

iv) a mask automatically generated from raw input data comprising a stable structure; and
v) a mask automatically generated from raw input data from a family of texture and color feature analyses.

6. The system for linking an object in accordance with claim 1, wherein said means for outputting an ROI tracking result generates an output selected from at least one from the group:
   i) a multi-tone figure ground mosaic scene based on multi-source feature signatures, in which each pixel is associated with a feature signature library by a quantitative measure;
   ii) an ROI link file based on static and dynamic ROI descriptors and a spatially-temporally-linked graph;
   iii) a graphic representation of the link file;
   iv) an object of interest;
   v) a feature of interest;
   vi) an Event or Activity;
   vii) a scene-content database for data mining; and
   viii) a rule set library.

7. The system of data-fusion in accordance with claim 1, wherein said rule set library contains at least one from the group:
   i) an ROI/object/feature extraction rule set;
   ii) an ROI linking rule set;
   iii) an Event detection rule set;
   iv) a figure ground structure generation rule set;
   v) a feature signature labeling rule set;
   vi) a feature signature updating rule set; and
   vii) a data fusion rule set.

8. A real time method of categorizing terrain and situation awareness in an image comprising a plurality of data sources, comprising:
   a) providing a region of interest (ROI) spatial mask in which pixels in a raw image are represented by a feature signature library from at least one data source by applying at least one data analysis method;
   b) creating a rule set library comprising at least one rule to allow a pixel in a raw image to be mapped into a feature signature scene using at least one feature signature;
   c) displaying the mapping results by tuning at least one of the group:
      i) number of sub-signatures in a group signature;
      ii) pixel to feature signature matching level;
      iii) density matching level;
      iv) grid size setting level to cover observed pixels;
      v) grid size stepping setting level;
      vi) number of group signatures; and
      vii) subsets of a feature signature library; and
   d) transforming the final feature signature matching result into a recognizable object, said final feature signature matching result comprising at least one of the group of:
      i) feature signature library;
      ii) pixel-to-signature matching measures;
      iii) ROI mask by individual feature signatures;
      iv) ROI mask by a selected set of feature signatures;
      v) rule set library;
      vi) unlabeled raster scenes from matching result;
      vii) labeled raster scenes from matching result;
      viii) raster image in a magnifying area;
      ix) full scene of the raster image; and
      x) summary project file.

9. The real time method of categorizing terrain and situation awareness in an image in accordance with claim 8, wherein the degree of match between a pixel of interest (POI) against the signature library is displayed in real time.

10. A real time method of categorizing terrain and situation awareness in an image in accordance with claim 8, wherein a feature signature is modified in real time by using any combination of said at least one feature signature.

11. A real time method of categorizing terrain and situation awareness in an image in accordance with claim 8, wherein said pixel to feature signature matching is performed by at least one of the group:
   i) a geometric distance measure;
   ii) a correlation measure;
   iii) a spectral angle measure; and
   iv) a spectral angle ratio measure.

12. The real time method of categorizing terrain and situation awareness in an image constructed from a plurality of data sources, in accordance with claim 8, wherein a feature signature extraction location in a boxing ROI is moved interactively by a user to modify an existing feature signature in real time.

13. A method for modeling and testing scene contents/analysis with a set of human language key words to extract an object in a raw image representing a space comprising a plurality of pixels or data representative thereof, the steps comprising:
   a) developing a set of human language-based, quantifiable, and implementable key words to represent and analyze the contents of a scene;
   b) quantifying each of said key words using at least one data analysis method;
   c) implementing at least a portion of said key words and using a processor to form a data/information analysis module; and
   d) using a processor to test/modify said data/information analysis module with competing data analysis modules until said system is optimized for a specific application, wherein said testing/modifying step is performed with a processor by at least one of the sub steps:
      i) completing implementations of a predetermined core data analysis routine;
      ii) completing implementations of a predetermined scene content modeling module; and
      iii) completing implementations of a predetermined scene content visualization module.

* * * * *